United States Patent
Nieda

(10) Patent No.: US 10,042,311 B2
(45) Date of Patent: Aug. 7, 2018

(54) DRIVE TRANSMISSION DEVICE AND IMAGE FORMING APPARATUS INCORPORATING THE DRIVE TRANSMISSION DEVICE

(71) Applicant: Hiroaki Nieda, Kanagawa (JP)

(72) Inventor: Hiroaki Nieda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/401,398

(22) Filed: Jan. 9, 2017

(65) Prior Publication Data
US 2017/0199490 A1    Jul. 13, 2017

(30) Foreign Application Priority Data
Jan. 12, 2016    (JP) ................. 2016-003851

(51) Int. Cl.
*G03G 15/00*    (2006.01)
*F16D 3/40*    (2006.01)

(52) U.S. Cl.
CPC ............. *G03G 15/757* (2013.01); *F16D 3/40* (2013.01)

(58) Field of Classification Search
CPC ................................ G03G 15/757; F16D 3/40
See application file for complete search history.

(56) References Cited

FOREIGN PATENT DOCUMENTS

| JP | 2013035673 A | 2/2013 |
|---|---|---|
| JP | 2013195961 A | 9/2013 |

OTHER PUBLICATIONS

"Bearing Is Used Here", Bearing, Bearing Editorial Sub-Committee, Japan Bearing Industry Association, Aug. 2008.
Manabu Hoshino, et al., "Fixed Constant Velocity Joint with a Super High Operating Angle of 54 Degrees (TUJ)", NTN Technical Review No. 75 (2007) pp. 16-19.

*Primary Examiner* — Erika J Villaluna
(74) *Attorney, Agent, or Firm* — Harness, Dickey & Pierce, P.L.C.

(57) ABSTRACT

A drive transmission device, which is included in an image forming apparatus, includes a drive transmission device including first and second rotary bodies, first and second grooves, a link device linking the first and second rotary bodies, a stopper, a guide groove, and a communication portion. The link device includes first and second inserting bodies and a link body linking the first and second inserting bodies. The stopper stops the first projection from being detached from the first groove. The guide groove guides the first projection into the first hollow body. The communication portion causes the guide groove and the first groove to communicate with each other. The first hollow body relieves the second projection closer to the first rotary body than the stopper in the axial direction of the first rotary body and in the direction of rotation of the first rotary body in assembly.

16 Claims, 23 Drawing Sheets

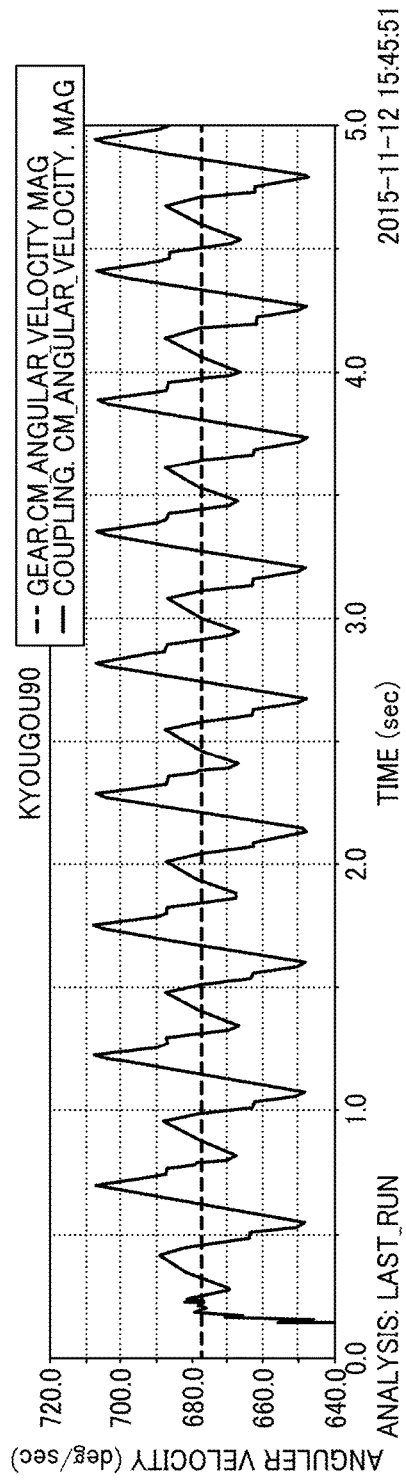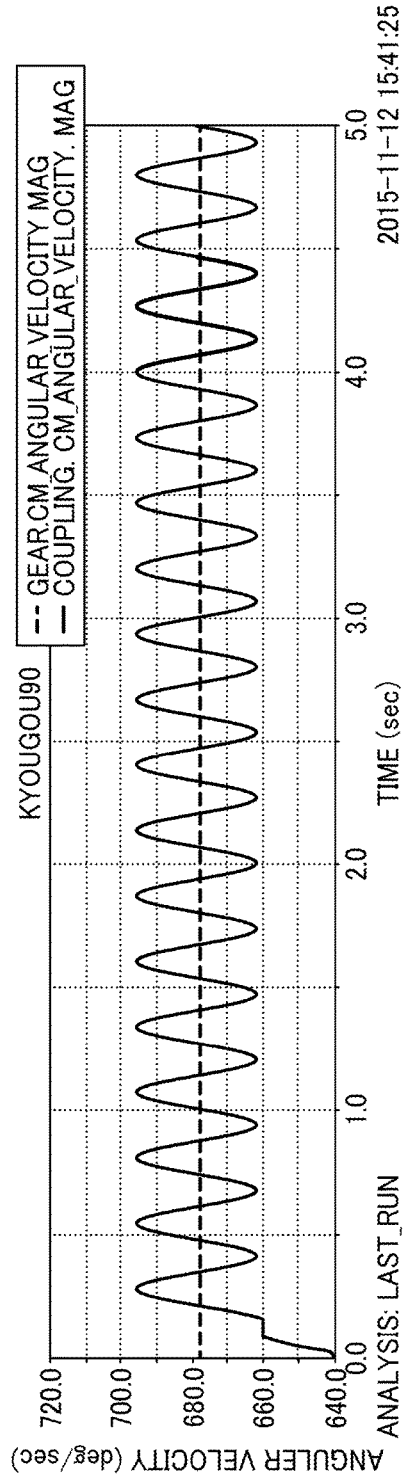

DRIVE TRANSMISSION DEVICE AND IMAGE FORMING APPARATUS INCORPORATING THE DRIVE TRANSMISSION DEVICE

CROSS-REFERENCE TO RELATED APPLICATION

This patent application is based on and claims priority pursuant to 35 U.S.C. § 119(a) to Japanese Patent Application No. 2016-003851, filed on Jan. 12, 2016, in the Japan Patent Office, the entire disclosure of which is hereby incorporated by reference herein.

BACKGROUND

Technical Field

This disclosure relates to a drive transmission device and an image forming apparatus incorporating the drive transmission device.

Related Art

Drive transmission devices are known to include a link device to link a first rotary body and a second rotary body.

For example, a known drive transmission device includes a link device including a first inserting body, a second inserting body, and a link body. The first inserting body has a spherical shape to be inserted into an opening that is a center of rotation of a first rotary body, and includes two first projections projecting from the outer circumferential surface in the radial direction. The two first projections of the first inserting body are disposed at an interval of 180 degrees in a direction of rotation of the first rotary body, so as to be engaged with a first groove that is provided in an inner circumferential surface of the opening of the first rotary body at the interval of 180 degrees in the direction of rotation and extending in the axial direction. Similarly, the second inserting body has a spherical body to be inserted into a recess of a second rotary body, and includes two second projections projecting from the outer circumferential surface in the radial direction. The two second projections of the second inserting body are disposed at an interval of 180 degrees in a direction of rotation of the second rotary body, so as to be engaged with a second groove that is provided in an inner circumferential surface of the recess of the second rotary body at the interval of 180 degrees in the direction of rotation and extending in the axial direction. The link body couples the first inserting body and the second inserting body. The known drive transmission device further includes a regulator to regulate the first inserting body of the link device from being detached from the opening of the first rotary body.

SUMMARY

At least one aspect of this disclosure provides a drive transmission device including a first rotary body, a second rotary body, a first groove, a second groove, a link device, a stopper, an opening, a guide groove, and a communication portion. The first rotary body has a first hollow body in a rotation center. The second rotary body has a second hollow body in a rotation center. The first groove is formed in an inner peripheral surface of the first hollow body of the first rotary body and extending in an axial direction of the first rotary body. The second groove is formed in an inner peripheral surface of the second hollow body of the second rotary body and extending in an axial direction of the second rotary body. The link device is configured to link the first rotary body and the second rotary body and includes a first inserting body, a second inserting body, and a link body. The first inserting body has a first projection protruding in a radial direction to be engaged with the first groove and is configured to be inserted into the first hollow body of the first rotary body and to move in the first hollow body of the first rotary body in the axial direction. The second inserting body has a second projection protruding in a radial direction to be engaged with the second groove. The second inserting body is configured to be inserted into the second hollow body of the second rotary body. A position of the second projection is different from a position of the first projection in a direction of rotation of the first rotary body. The link body is configured to link the first inserting body and the second inserting body. The stopper is disposed at an end portion of the first groove on a side facing the second rotary body and is configured to stop the first projection from being detached from the first groove. The guide groove has an opening formed in an end portion of the first hollow body of the first rotary body on a side facing the second rotary body and formed at a position different from a position of the first groove in a direction of rotation of the first rotary body. The guide groove is configured to extend in the axial direction of the first rotary body and guide the first projection into the first hollow body when the first inserting body is inserted into the first hollow body. The guide groove is configured to extend in the axial direction of the first rotary body and guide the first projection into the first hollow body when the first inserting body is inserted into the first hollow body. The communication portion is configured to cause the guide groove and the first groove to communicate with each other in the first hollow body of the first rotary body. The end portion of the first hollow body of the first rotary body on the side facing the second rotary body is formed such that the second projection is relieved closer to the first rotary body than the stopper in the axial direction of the first rotary body and in the direction of rotation of the first rotary body when assembling the link device to the first rotary body.

Further, at least one aspect of this disclosure provides an image forming apparatus including an apparatus body having a shaft, and the above-described drive transmission device configured to transmit a driving force to the apparatus body.

BRIEF DESCRIPTION OF THE SEVERAL VIEWS OF THE DRAWINGS

FIG. 24 is a graph illustrating speed variations of a photoconductor drum checked when a shaft center of a drum shaft is shifted from a rotary shaft of a photoconductor gear by a predetermined amount in a comparative configuration;

FIG. 25 is a graph illustrating speed variations of a photoconductor drum checked when a shaft center of a drum shaft is shifted from a rotary shaft of a photoconductor gear by a predetermined amount in a configuration according to the present embodiment of this disclosure.

DETAILED DESCRIPTION

Figure 1:
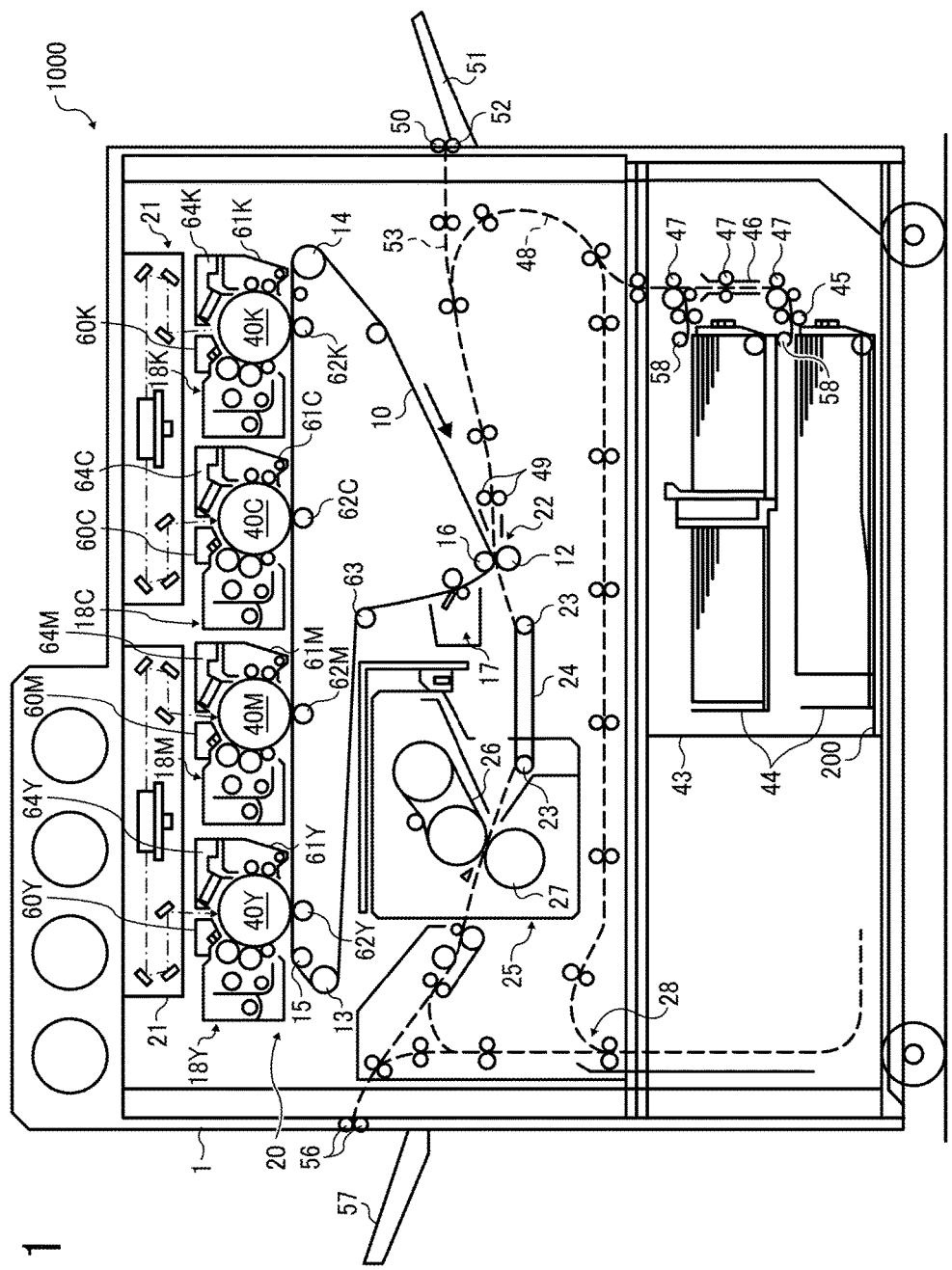
FIG. 1 is a diagram illustrating a schematic configuration of an electrophotographic image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

A description is given of a basic configuration of an electrophotographic image forming apparatus 1000 for forming an image, according to the present embodiment of this disclosure, with reference to FIG. 1.

It is to be noted that identical parts are given identical reference numerals and redundant descriptions are summarized or omitted accordingly.

The image forming apparatus 1000 may be a copier, a facsimile machine, a printer, a multifunction peripheral or a multifunction printer (MFP) having at least one of copying, printing, scanning, facsimile, and plotter functions, or the like. According to the present embodiment, the image forming apparatus 1000 is an electrophotographic printer that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

Hereinafter, a color laser printer according to an embodiment of this disclosure is described as an image forming apparatus in an electrophotography system, to which the present invention is applied.

FIG. 1 is a schematic diagram illustrating an entire configuration of the image forming apparatus 1000 according to an embodiment of this disclosure. The image forming apparatus 1000 is an electrophotographic image forming apparatus including functions of a tandem and intermediate transfer. The image forming apparatus 1000 in FIG. 1 includes an apparatus body 1 and a sheet feeding table 200 on which the apparatus body 1 is mounted. The sheet table 200 functions as a sheet feeding device to accommodate and feed a sheet that functions as a recording medium. It is to be noted that suffixes "Y", "M", "C", and "K" represent respective colors of yellow, cyan, magenta, and black.

The apparatus body 1 includes an intermediate transfer belt 10 of an endless belt type at the center. The intermediate transfer belt 10 is wound around multiple support rollers 13, 14, 15, 16, and 63 and rotates in a clockwise direction of FIG. 1.

A belt cleaning device 17 is disposed on a left side of a secondary transfer opposing roller 16 that is one of the support rollers wound around the intermediate transfer belt 10 in FIG. 1. The belt cleaning device 17 removes residual toner remaining on a surface of the intermediate transfer belt 10 after an image formed on the surface of the intermediate transfer belt 10 is transferred.

A tandem image forming device 20 includes four image forming units 18Y, 18M, 18C, and 18K aligned along a belt moving direction on and over the intermediate transfer belt 10 stretched between the support rollers 14 and 15.

Hereinafter, the units and components included in the image forming apparatus 1000 are occasionally referred to in a singular form collectively, such as the image forming unit 18.

As illustrated in FIG. 1, an exposure device 21 are aligned above the tandem image forming device 20.

The image forming units 18Y, 18M, 18C, and 18K of the tandem image forming device 20 include photoconductor drums 40Y, 40M, 40C, and 40K, respectively. The image forming units 18Y, 18M, 18C, and 18K function image bearers to bear yellow, magenta, cyan, and black toner images, respectively.

The image forming unit 18 (i.e., the image forming units 18Y, 18M, 18C, and 18K) further includes a charging device 60 (i.e., charging devices 60Y, 60M, 60C, and 60K), a developing device 61 (i.e., developing devices 61Y, 61M, 61C, and 61K), and a photoconductor drum cleaning device 64 (i.e., drum cleaning devices 64Y, 64M, 64C, and 64K). The charging device 60 uniformly charges the surface of the photoconductor drum 40 (i.e., the photoconductor drums 40Y, 40M, 40C, and 40K), so that the photoconductor drum 40 is exposed by the exposure device 21 based on image data to form an electrostatic latent image on the surface of the photoconductor drum 40.

The developing device 61 develops the electrostatic latent image formed on the surface of the photoconductor drum 40 by the exposure device 21 into a visible toner image.

The photoconductor cleaning device 64 cleans the surface of the photoconductor drum 40 after the electrostatic latent image is transferred onto the surface of the intermediate transfer belt 10.

Further, primary transfer rollers 62Y, 62M, 62C, and 62K are disposed at a primary transfer position where the toner image is transferred from the photoconductor drums 40Y, 40M, 40C, and 40K onto the intermediate transfer belt 10. At the primary transfer position, the primary transfer rollers 62Y, 62M, 62C, and 62K are disposed facing the photoconductor drums 40Y, 40M, 40C, and 40K, respectively, with the intermediate transfer belt 10 interposed therebetween.

The support roller 14 is a driving roller to drive and rotate the intermediate transfer belt 10. When a black toner image is formed on the intermediate transfer belt 10, the support rollers 13 and 15, both of which are driven rollers, may be moved to separate the photoconductor drums 40Y, 40M, 40C, and 40K from the intermediate transfer belt 10.

The apparatus body 1 includes a secondary transfer device 22 at an opposite side of the tandem image forming device 20 across the intermediate transfer belt 10. The secondary transfer device 22 forms a secondary transfer nip region by pressing a secondary transfer roller 12 against the secondary transfer opposing roller 16 in the configuration illustrated in FIG. 1. By applying a transfer electric field to the secondary transfer roller 12 and the secondary transfer opposing roller 16, the toner image formed on the surface of the intermediate transfer belt 10 is transferred onto a sheet S that functions as a transfer sheet.

Further, a fixing device 25 is disposed next to (in FIG. 1, on a left side of) the secondary transfer device 22. The fixing device 25 fixes the toner image formed on the sheet S to the sheet S. The fixing device 25 includes a fixing belt 26 and a pressure roller 27. The pressure roller 27 presses the fixing belt 26 that is an endless belt. After the toner image is transferred onto the sheet S, the sheet conveying belt 24 conveys the sheet S to the fixing device 25.

A sheet conveying belt 24 is disposed between the secondary transfer device 22 and the fixing device 25 and wound around belt supporting rollers 23. The sheet conveying belt 24 conveys the sheet S that has received the toner image from the intermediate transfer belt 10 by the secondary transfer device 22 to the fixing device 25.

It is to be noted that the image forming apparatus 1000 illustrated in FIG. 1 further includes a sheet reversing device 28 below the secondary transfer device 22 and the fixing device 25 and parallel to the tandem image forming device 20. The sheet reversing device 28 reverses the sheet S when performing duplex printing on both sides of the sheet S.

On transmission of image data to the apparatus body 1 of the image forming apparatus 1000 and receipt of a signal to start image formation, a drive motor provided to the image forming apparatus 1000 is caused to rotate the support roller 14. Accordingly, the other multiple support rollers (e.g., the support rollers 13, 15, 16, and 63) rotate in response to rotation of the support roller 14, the intermediate transfer belt 10 rotates endlessly. At the same time, the exposure device 21 starts forming respective latent images on the respective photoconductor drums 40Y, 40M, 40C, and 40K of the image forming units 18Y, 18M, 18C, and 18K.

Then, the developing devices 41Y, 41M, 41C, and 41K of the image forming units 18Y, 18M, 18C, and 18K develop the respective latent images into visible single color toner images of yellow, magenta, cyan, and black. Along with endless movement of the intermediate transfer belt 10, the respective visible single toner images are conveyed to respective primary transfer nip regions formed between the photoconductor drums 40Y, 40M, 40C, and 40K and the primary transfer rollers 62Y, 62M, 62C, and 62K, respectively. In the respective transfer nip regions, the respective single color toner images are sequentially transferred onto the surface of the intermediate transfer belt 10 to form a composite color toner image on the surface of the intermediate transfer belt 10.

The image forming apparatus 1000 further includes multiple sheet trays 44 provided to a sheet bank 43 in the sheet feeding table 200. Each of the multiple sheet trays 44 has a sheet roller 58. A selected one of the sheet rollers 58 rotates to feed the sheet S from the sheet tray 44 having the selected sheet roller 58. The sheet S fed from the selected sheet tray 44 is separated by a separation roller 45 one by one and is conveyed to a sheet feeding passage 46. Then, the sheet S is conveyed by a sheet conveying roller 47 to an apparatus side sheet conveying passage 48 in the apparatus body 1 until the sheet S abuts against a pair of registration rollers 49 to stop.

Alternatively, a bypass sheet feed roller 50 rotates to feed a sheet S placed on a bypass tray 51. The fed sheet S is separated by a bypass separation roller 52 one by one to be conveyed to a bypass sheet feeding path 53 until the sheet S abuts against the pair of registration rollers 49 to stop.

The pair of registration rollers 49 rotates in synchronization with movement of the composite color toner image formed on the surface of the intermediate transfer belt 10, so that the sheet S is conveyed to an image transfer position between the secondary transfer roller 12 of the secondary transfer device 22 and the intermediate transfer belt 10. The color toner image formed on the intermediate transfer belt 10 is transferred onto the sheet S.

The sheet S after the secondary image transfer is then conveyed by the secondary transfer device 22 via the sheet conveying belt 24 to the fixing device 25. In the fixing device 25, the color toner image on the sheet S is fixed to the sheet S by application of heat and pressure. Thereafter, a sheet discharging roller 56 rotates to convey the sheet S to an outside of the image forming apparatus 1000. The sheet S is then stacked on a sheet discharging tray 57.

In duplex printing, a switching claw moves to switch a direction of passage of the sheet S after the fixing device 25 to the sheet reversing device 28 where the sheet S is reversed and guided to the image transfer position again. Then, a color toner image is formed on the rear side of the sheet S and then discharged by the sheet discharging roller 56 to be discharged to the sheet discharging tray 57.

The intermediate transfer belt 10 has residual toner remaining on the surface thereof after the secondary image transfer. The belt cleaning device 17 removes the residual toner form the surface of the intermediate transfer belt 10 to clean the intermediate transfer belt 10 for a subsequent image formation performed by the tandem image forming device 20.

In the image forming apparatus 1000 having the above-described configuration, a front cover is disposed at a front side of the apparatus body 1, which is a near side of the drawing sheet of FIG. 1. The front cover is attached to the apparatus body 1 to open and close about a support shaft. By rotating the front cover about the support shaft to open the front cover from the apparatus body 1, the photoconductor drum 40, the charging device 60, the developing device 61, and the photoconductor drum cleaning device 64 can be installed into or removed from the inside of the apparatus body 1 at the same time as a single unit. When any one of the photoconductor drum 40, the charging device 60, the developing device 61, and the photoconductor drum cleaning device 64 is reaching the end of the service life, these devices are removed altogether as a single unit and replaced with a new unit. Therefore, a drive transmission device that transmits a driving force from the drive motor that functions as a drive source of the apparatus body 1 to a rotary body of a drive transmission target such as the photoconductor drum 40 includes a link device to detachably couple the drive transmission target and the apparatus body 1.

It is to be noted that the present embodiment of this disclosure presents the configuration of a drive transmission device to transmit a driving force to the photoconductor drum 40 as a drive transmission target. However, the drive transmission target is not limited to the photoconductor drum 40 but can be a different rotary body such as a developing roller and a toner screw both provided to the developing device 61 and the sheet roller(s) 58 of the sheet feeding table 200.

Figure 2:
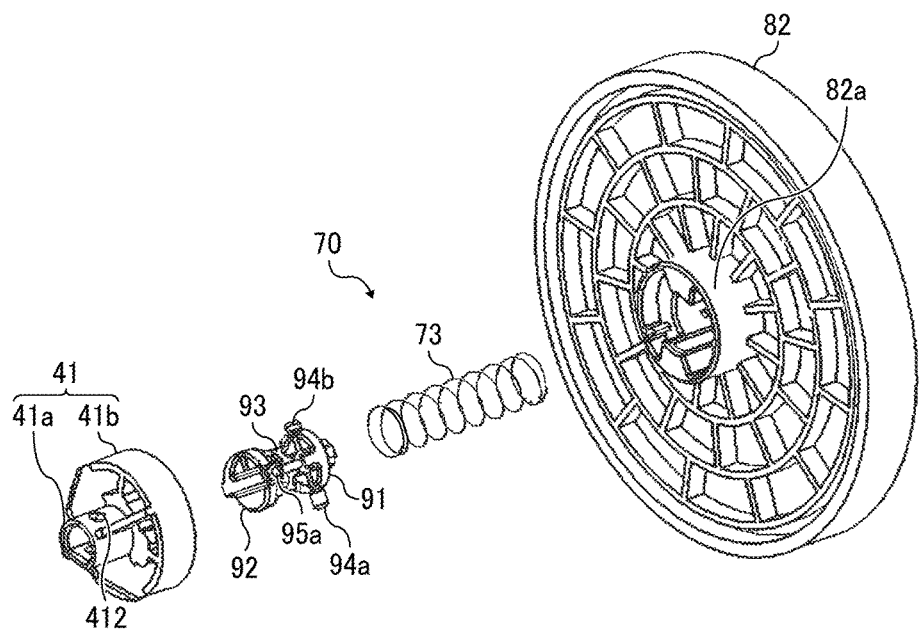
FIG. 2 is an exploded perspective view illustrating a drive transmission device included in the image forming apparatus of FIG. 1.
Figure 3:
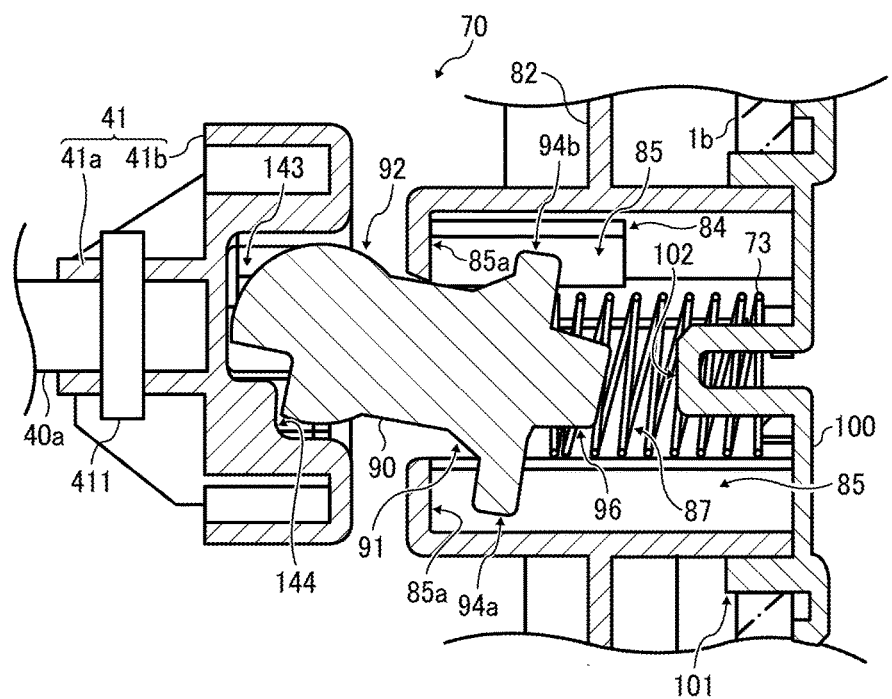
FIG. 3 is a cross sectional view illustrating the drive transmission device of FIG. 2.

FIG. 2 is an exploded perspective view illustrating a drive transmission device 70 included in the image forming apparatus 1000. FIG. 3 is a cross sectional view illustrating the drive transmission device 70 of FIG. 2.

The drive transmission device 70 includes a photoconductor gear 82, a coupling member 41, a link device 90, and a coil spring 73.

The photoconductor gear 82 functions as a first rotary body to which a driving force is transmitted from a drive motor.

The coupling member 41 functions as a second rotary body that is attached to an end portion of a drum shaft 40a of the photoconductor drum 40.

The link device 90 drives and links the photoconductor gear 82 and the coupling member 41.

The coil spring 73 biases the link device 90 that is attached to the photoconductor gear 82 toward the coupling member 41.

A drive side cylindrical portion 82a into which a drive side spherical portion 91, which functions as a first inserting body, of the link device 90 is inserted is included in a rotation center of the photoconductor gear 82. The coupling member 41 includes a cylindrical shaft inserting portion 41a into which a leading end portion of the photoconductor drum shaft 40a is inserted, and a driven side cylindrical portion 41b to which a driven side spherical portion 92, which functions as a second inserting body, of the link device 90 is inserted.

A through hole 412 through which a parallel pin 411 penetrates is provided in the shaft inserting portion 41a, the parallel pin 411 being provided to the photoconductor drum shaft 40a.

The link device 90 includes the drive side spherical portion 91 that functions as a first inserting body, the driven side spherical portion 92 that functions as a second inserting body, and a linking member 93 that functions as a link body to link the drive side spherical portion 91 and the driven side spherical portion 92.

The drive side spherical portion 91 includes a first drive side projection 94a and a second drive side projection 94b. The first drive side projection 94a protrudes from a surface of the drive side spherical portion 91 in a radial direction. The second drive side projection 94b is provided at an interval of an angle of 180 degrees in a rotation direction from the first drive side projection 94a.

The driven side spherical portion 92 includes two driven side projections 95a, each of which protrudes from a surface of the driven side spherical portion 92 in the radial direction at an interval of an angle of 180 degrees in the rotation direction.

Figure 4A:
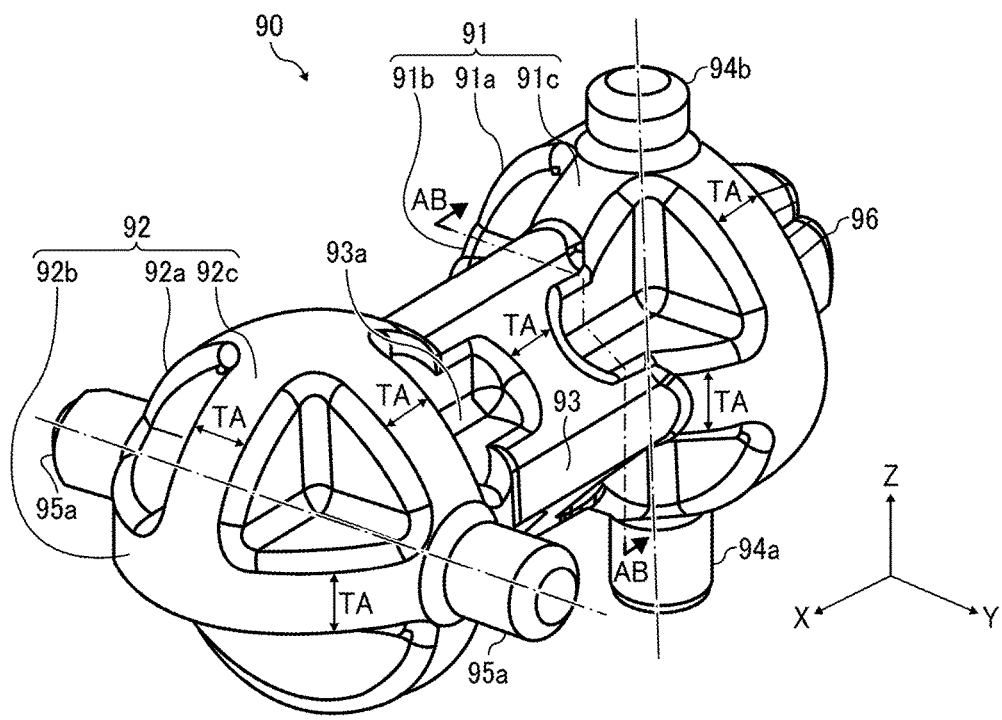
FIG. 4A is a perspective view illustrating a link device.
Figure 4B:
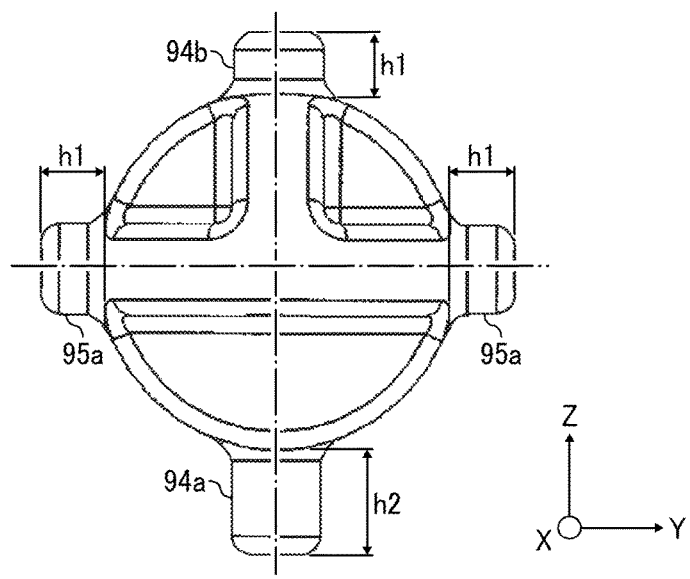
FIG. 4B is a front view illustrating the link device of FIG. 4A, viewed from a driven side spherical portion.
Figure 4C:
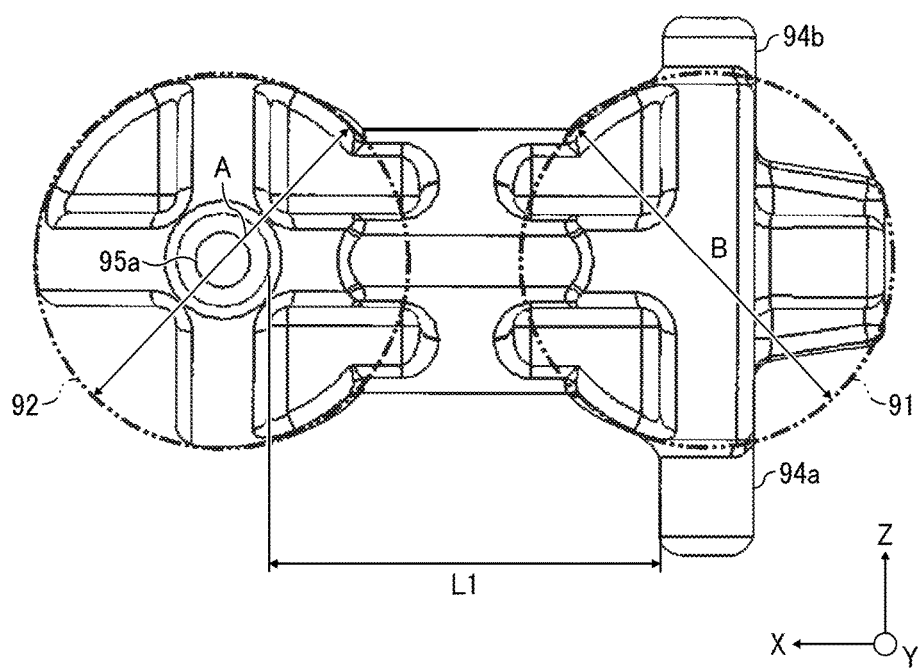
FIG. 4C is a side view of the link device of FIG. 4A.
Figure 5:
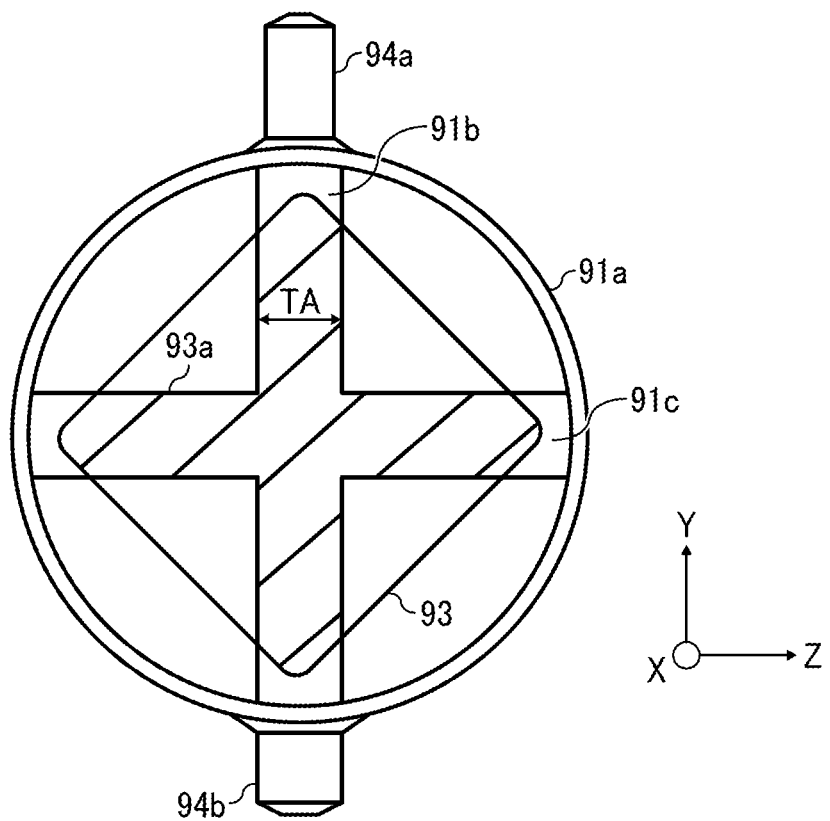
FIG. 5 is a cross sectional view of the link device of FIG. 4A, along a line AB-AB.

FIGS. 4A, 4B, and 4C are diagrams illustrating a configuration of the link device 90. FIG. 5 is an AB-AB cross-sectional view of FIG. 4A. Specifically, FIG. 4A is a perspective view illustrating the link device 90. FIG. 4B is a front view illustrating the link device 90 of FIG. 4A, viewed from the driven side spherical portion 92. FIG. 4C is a side view of the link device 90 of FIG. 4A.

In the description below, an axial direction is an X direction, a protruding direction of the driven side projections 95a is a Y direction, and a direction perpendicular to the X direction and the Y direction is a Z direction.

The link device 90 is a resin molded item, and the drive side spherical portion 91, the driven side spherical portion 92, the linking member 93, the first drive side projection 94a and the second drive side projection 94b, and the driven side projections 95a are an integrated object made of resin material. As the resin used for formation of the link device 90, a polyacetal resin (POM) having excellent mechanical strength and favorable wear resistance and slidability can be preferably used.

Since the link device 90 is molded by injection molding, for example, sink marks are caused and the drive side spherical portion 91, the driven side spherical portion 92, and the linking member 93 are deformed due to the sink marks. Therefore, it is likely that the deformation adversely affects the quality. In order to avoid this inconvenience, in the present embodiment, the drive side spherical portion 91, the driven side spherical portion 92, and the linking member 93 are lightened, thereby restraining occurrence of the sink marks.

The drive side spherical portion 91 has a hemisphere shape that is lightened, leaving a first drive side large circle 91a that is a spherical large circle perpendicular to the X direction, a second drive side large circle 91b that is a spherical large circle perpendicular to the Z direction, and a third drive side large circle 91c that is a spherical large circle perpendicular to the Y direction. Further, the driven side spherical portion 92 has a spherical shape that is lightened, leaving a first driven side large circle 92a that is a spherical large circle perpendicular to the X direction, a second driven side large circle 92b that is a spherical large circle perpendicular to the Z direction, and a third driven side large circle 92c that is a spherical large circle perpendicular to the Y direction. It is to be noted that the large circle refers to a circle made such that a plane, which passes through the center of a sphere, intersects with a spherical surface.

Further, the linking member 93 has an approximately square pole shape, and a plurality of lightening portions 93a formed by lightening side surfaces of the linking member 93 is provided at intervals TA in the X direction in FIG. 4A. As illustrated in FIG. 5, the lightening portion 93a is lightened, leaving a linear portion extending in the Y direction and a linear portion extending in the Z direction in FIG. 5, and has a cross shape in cross section. Further, the linking member 93 is formed to have the side surfaces inclined by an angle of 45 degrees with respect to the Y direction. As described above, by forming the side surfaces to be inclined by an angle of 45 degrees with respect to the Y direction, the linear portions of the lightening portion 93a become diagonal lines of a square, and the linear portions of the lightening portion 93a can be made longer than a case in which the side surfaces of the linking member 93 are formed to become planes parallel to a plane perpendicular to the Y direction.

Accordingly, a decrease in strength of the linking member 93 due to the lightening can be restrained.

The first drive side projection 94a and the second drive side projection 94b have a columnar shape, and are provided in intersecting portions of the first drive side large circle 91a and the third drive side large circle 91c. As illustrated in FIG. 4B, a height h2 of the first drive side projection 94a is greater than a height h1 of the second drive side projection 94b and a height h1 of the driven side projections 95a.

In the present embodiment, the drive side spherical portion 91 has a lightened hemisphere shape. However, the shape may be appropriately determined according to a maximum inclination angle of the link device 90. Further, a spring bearing 96 is provided in a rotation center of the drive side spherical portion 91.

The driven side projections 95a also have a columnar shape, and are provided in intersecting portions of the first driven side large circle 92a and the second driven side large circle 92b. The driven side projections 95a are provided with the phase shifted from the first drive side projection 94a and the second drive side projection 94b by an angle of 90 degrees in the rotation direction. The third driven side large circle 92c of the driven side spherical portion 92 on a side close to the coupling member 41 with respect to the first driven side large circle 92a is formed in a single direction side (i.e., the left side in FIG. 4A) of the Z direction with respect to the second driven side large circle 92b, and has a shape cut in the other side of the Z direction.

As illustrated in FIG. 4C, a diameter B of the drive side spherical portion 91 is equal to a diameter A of the driven side spherical portion 92.

Figure 6A:
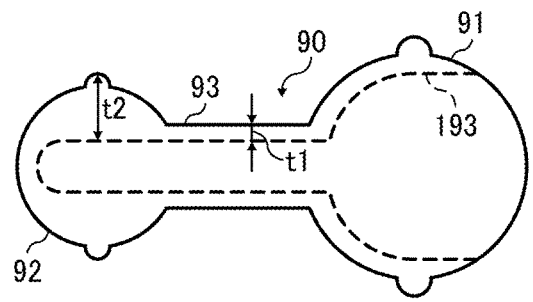
FIGS. 6A, 6B, and 6C are diagrams illustrating an example of lightening of a comparative link device.
Figure 6B:
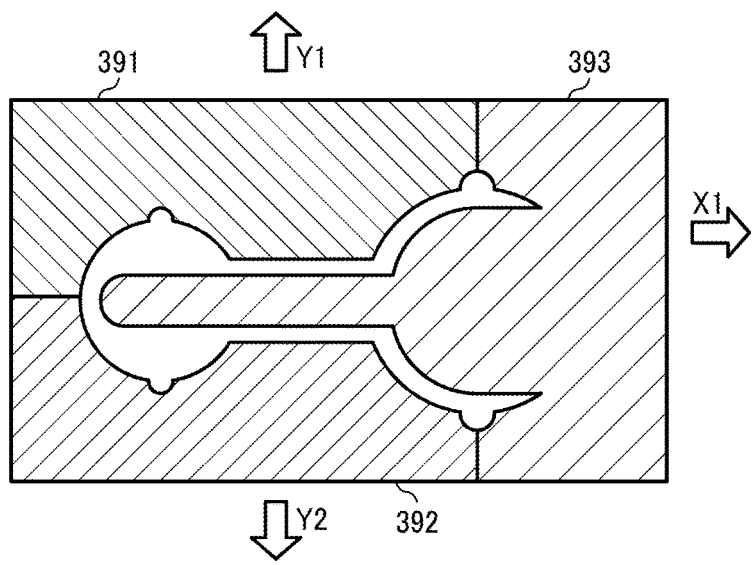
Figure 6C:
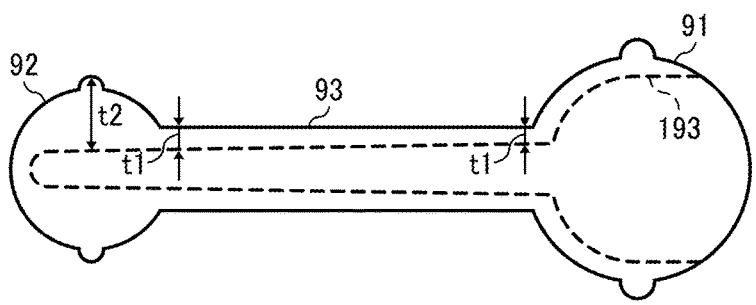

FIGS. 6A, 6B, and 6C are diagrams illustrating an example of lightening of a comparative link device As illustrated in FIG. 6A, in a case of reducing the thickness of the link device 90 to restrain sink marks by providing a lightening portion 193 having a hole shape with a drive side spherical portion 91 side open to the link device 90, a mold structure is determined as illustrated in FIG. 6B. That is, the mold structure includes a first mold 391 that is moved in a Y1 direction, a second mold 392 that is moved in a Y2 direction, and a third mold 393 that is moved in an X1 direction. In such lightening, the third mold 393 that forms the lightening portion 193 having a slot shape extending in the axial direction is designed to significantly move in the X1 direction to pull out the third mold 393 from the molded link device 90. Further, the third mold 393 has a portion in which the lightening portion 193 having a hole shape is formed. The portion of the third mold 393 is designed to have at least φ8 mm in terms of strength, and therefore it is difficult to achieve a reduction in size of the link device 90.

Further, the comparative structure provided with the lightening portion 193 having a hole shape has a thickness t1 of the linking member 93 and a thickness t2 of different portions of the driven side spherical portion 92.

In the comparative structure, in order to preferably pull out the third mold 393 from the molded link device 90, it is preferable that the lightening portion 193 has a shape with a diameter gradually made greater toward the drive side spherical portion 91. As a result, in a case in which the link device 90 has the shape extending in the axial direction, as illustrated in FIG. 6C, the driven side spherical portion 92 cannot be sufficiently lightened and the thickness t2 of the driven side spherical portion 92 increases to be thicker, and therefore the sink marks of the driven side spherical portion 92 cannot be sufficiently restrained. Therefore, in the structure illustrated in FIGS. 6A through 6C, it is preferable that the length of the link device 90 in the axial direction is reduced to be 25 mm or smaller so as to reduce the thickness t2 of the driven side spherical portion 92.

Figure 7A:
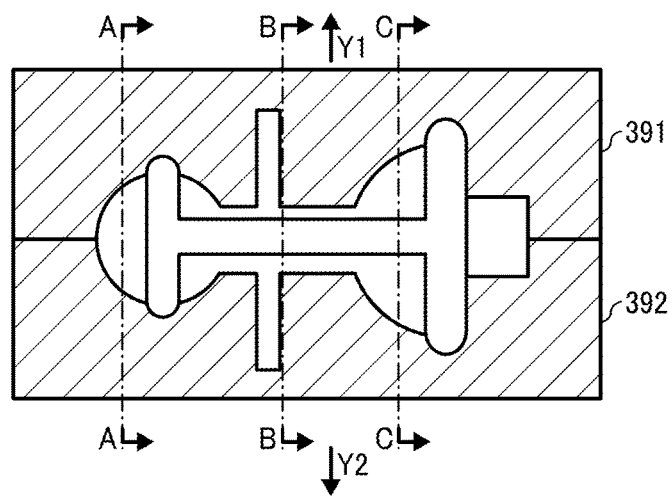
FIGS. 7A, 7B, 7C, and 7D are diagrams illustrating a molding example of the link device of the present embodiment.
Figure 7B:
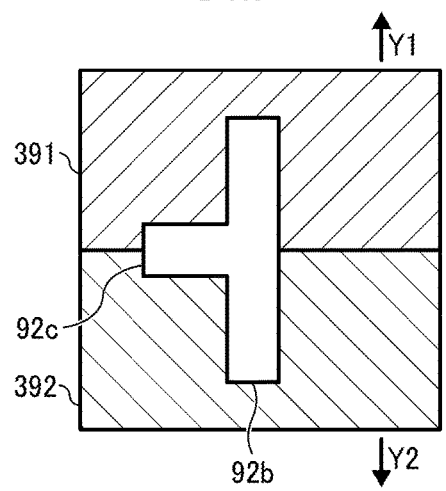
Figure 7C:
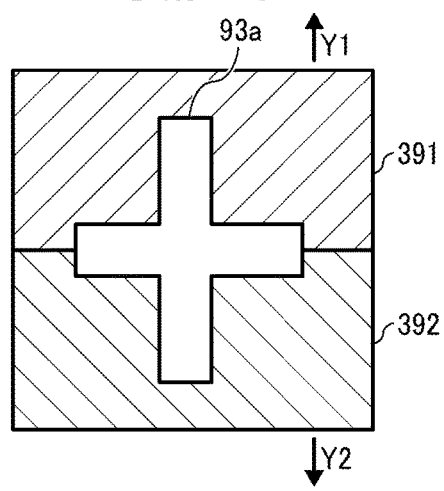
Figure 7D:
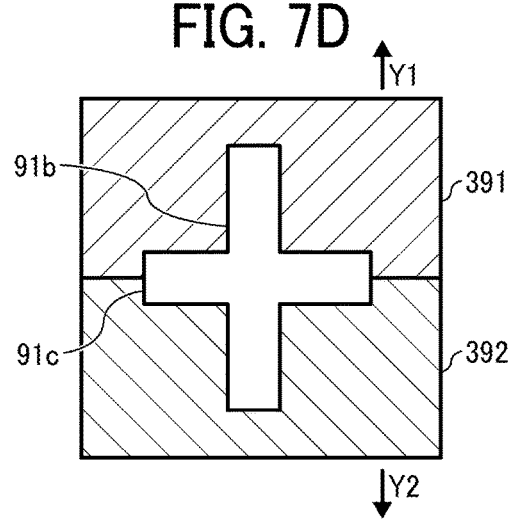

FIGS. 7A, 7B, 7C, and 7D are diagrams illustrating a molding example of the link device 90 of the present embodiment. Specifically, FIG. 7A is a cross-sectional view illustrating a molding example of the link device 90. FIG. 7B is an A-A vertical cross-sectional view of FIG. 7A. FIG. 7C is a B-B vertical cross-sectional view of FIG. 7A. Further, FIG. 7D is a C-C vertical cross-sectional view of FIG. 7A.

By forming the lightening portion 93a into the cross shape in cross section made of the linear portion extending in the Y direction and the linear portion extending in the Z direction, the lightening portion 93a is formed by a first mold 391 and a second mold 392, as illustrated in FIG. 7C. Further, as illustrated in FIGS. 7B and 7D, the second drive side large circle 91b and the third drive side large circle 91c of the drive side spherical portion 91 and the second driven side large circle 92b and the third driven side large circle 92c of the driven side spherical portion 92 are molded with the first mold 391 and the second mold 392, similarly to the lightening portion 93a of the linking member 93. Accordingly, as illustrated in FIG. 7A, the link device 90 is molded with the first mold 391 that is moved in the Y1 direction and the second mold 392 that is moved in the Y2 direction, and therefore is molded with a smaller number of molds than the comparative example illustrated in FIGS. 6A through 6C.

Further, the link device 90 can be reduced in size, compared with the configuration illustrated in FIGS. 6A through 6C. Further, even when the length of the link device 90 in the axial direction is increased, the thicknesses of the driven side spherical portion 92, the linking member 93, and the drive side spherical portion 91 can be made equal. Accordingly, even when the link device 90 has a slot shape extending in the axial direction, a decrease in accuracy due to an influence of the sink marks can be restrained.

In the present embodiment, the thickness of the first drive side large circle 91a, the second drive side large circle 91b, and the third drive side large circle 91c of the drive side spherical portion 91, the first driven side large circle 92a, the second driven side large circle 92b, and the third driven side large circle 92c of the driven side spherical portion 92, and the thickness of the lightening portion 93a of the linking member 93, as illustrated in FIGS. 5, and the thickness of the lightening portion 93a of the link member 93 are equally TA [mm], as illustrated in FIG. 4A. Accordingly, the influence due to the sink marks of the portions can be restrained, and the link device 90 can be accurately molded.

Figure 8:
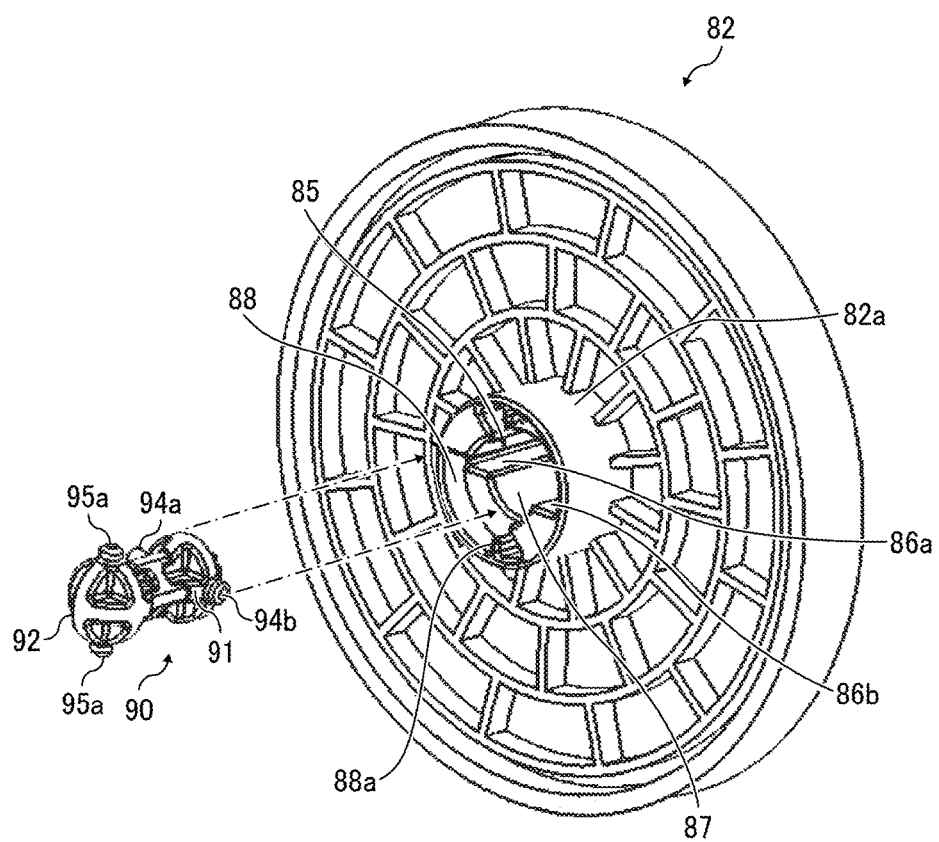
FIG. 8 is a perspective view illustrating a photoconductor gear and the link device according to an embodiment of this disclosure.

FIG. 8 is a perspective view illustrating the photoconductor gear 82 and the link device 90.

The photoconductor gear 82 is a resin molded item made of a polyacetal resin (POM), and includes the drive side cylindrical portion 82a in the rotation center. The drive side cylindrical portion 82a is provided with a drive side opening 87 into which the drive side spherical portion 91 of the link device 90 is inserted. Further, the drive side cylindrical portion 82a also includes two drive side grooves 85 into which the first drive side projection 94a and the second drive side projection 94b of the link device 90 are inserted, with an interval of an angle of 180 degrees in the rotation direction.

Further, the drive side cylindrical portion 82a includes a first guide groove 86a and a second guide groove 86b. The first guide groove 86a is disposed adjacent to one of the two drive side grooves 85 in the rotation direction to guide the first drive side projection 94a. The second guide groove 86b that functions as a phase matching groove is disposed adjacent to the other of the two drive side grooves 85 in the rotation direction to guide the second drive side projection 94b. The one of the two drive side grooves 85 and the first guide groove 86a communicate with each other at a far side via a communication portion 84. The other of the two drive side groove 85 and the second guide groove 86b similarly communicate with each other at a far side via the communication portion 84.

A stopper 85a is provided at an end portion (e.g., a near side end portion) of the drive side grooves 85 on a side facing the coupling member 41. Hereinafter, in the present embodiment of this disclosure, an end portion of any member on a side facing the coupling member 41 is also referred to as a "coupling side end portion". When the link device 90 is about to be pulled out from the coupling side end portion of the drive side opening 87, the first drive side projection 94a and the second drive side projection 94b abut against the stoppers 85a. Accordingly, the link device 90 is prevented from being pulled out from the coupling side end portion of the drive side opening 87.

Further, two undercuts 88 are disposed spaced apart from each other on the drive side cylindrical portion 82a at an interval of 180 degrees in the direction of rotation, recessed in the coupling side end portion. The undercuts 88 relieve the driven side projections 95a in the drive side cylindrical portion 82a when the link device 90 is assembled to the photoconductor gear 82.

Next, a description is given of attachment of the link device 90 to the photoconductor gear 82.

Figure 9A:
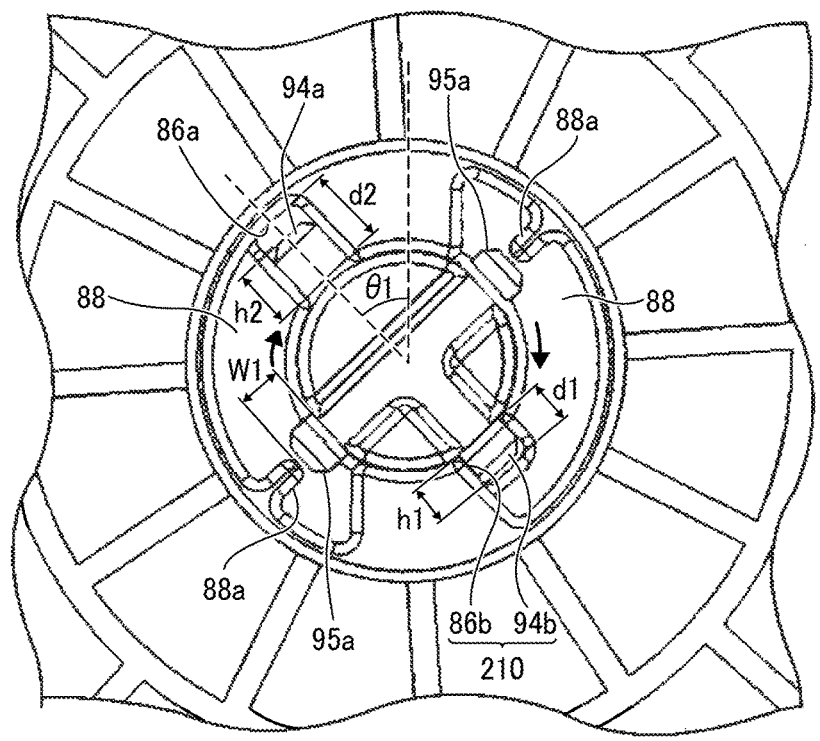
FIG. 9A is a front view illustrating a drive side cylindrical portion of the photoconductor gear.
Figure 9B:
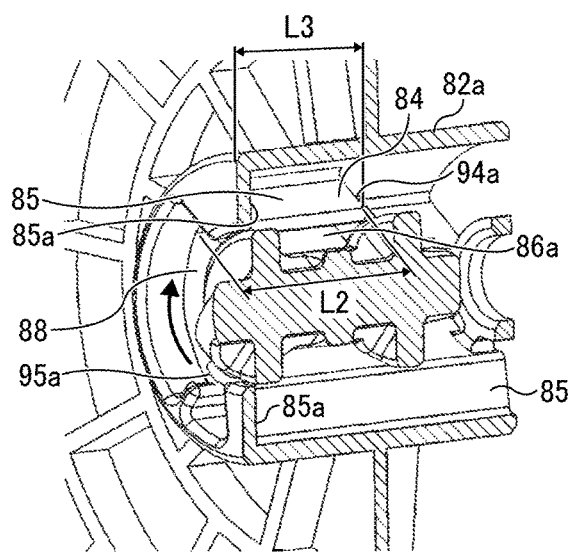
FIG. 9B is a perspective cross sectional view illustrating the drive side cylindrical portion of the photoconductor gear of FIG. 9A.

FIGS. 9A and 9B are diagrams illustrating how to attach the link device 90 to the photoconductor gear 82. Specifically, FIG. 9A is a front view illustrating the drive side cylindrical portion 82a of the photoconductor gear 82. FIG. 9B is a perspective cross sectional view illustrating the drive side cylindrical portion 82a of the photoconductor gear 82 of FIG. 9A.

First, the coil spring 73 is pushed into the drive side opening 87 of the drive side cylindrical portion 82a. Then, as illustrated in FIG. 8, a position of the link device 90 in the rotation direction is adjusted with respect to the photoconductor gear 82 such that the first drive side projection 94a is inserted into the first guide groove 86a and the second drive side projection 94b is inserted into the second guide groove 86b.

In the present embodiment, the height of the first drive side projection 94a is greater than the height h1 of the second drive side projection 94b that functions as a phase matching projection. In addition, and a groove depth d1 of the second guide groove 86b that functions as a phase matching groove is made smaller than a groove depth d2 of the first guide groove 86a and smaller than the height h2 of the first drive side projection 94a. Accordingly, the first drive side projection 94a cannot be inserted into the second guide groove 86b while the second drive side projection 94b can be inserted into the second guide groove 86b. Accordingly, the link device 90 can be attached to the photoconductor gear 82 at a predetermined phase to the photoconductor gear 82. That is, in the present embodiment, the second drive side projection 94b and the second guide groove 86b configure a first phase matching device 210.

Further, the diameter of the second drive side projection 94b that functions as a phase matching projection may be made greater than the diameter of the first drive side projection 94a, and the diameter of the first guide groove 86a may be made smaller than the groove width of the second drive side projection 94b. With the configuration, the second drive side projection 94b can be inserted into the second guide groove 86b solely, and the link device 90 can be attached to the photoconductor gear 82 at a predetermined phase to the photoconductor gear 82.

Further, the diameter of the second drive side projection 94b as a phase matching projection may be made smaller than the diameter of the first drive side projection 94a, and the groove width of the second guide groove 86b may be made smaller than the groove width of the first guide groove 86a and smaller than the diameter of the diameter of the first drive side projection 94a. With the configuration, the second drive side projection 94b can be inserted into the second guide groove 86b solely, and the link device 90 can be attached to the photoconductor gear 82 at a predetermined phase to the photoconductor gear 82.

Further, the second drive side projection 94b may be provided with a recess in a position that does not affect drive transmission thereof and the second guide groove 86b may be provided with a projection to be fitted to the recess of the second drive side projection 94b. By so doing, the first drive side projection 94a may be made uninsertable into the second guide groove 86b by the projection of the second guide groove 86b. Accordingly, the second drive side projection 94b can be inserted into the second guide groove 86b solely, and the link device 90 can be attached to the photoconductor gear 82 at a predetermined phase to the photoconductor gear 82. Further, the projection may be provided in a position not affecting the drive transmission of the second drive side projection 94b, and the recess to which the projection is fitted may be provided to the second guide groove 86b.

Next, the drive side spherical portion 91 of the link device 90 is inserted into the drive side opening 87, the first drive side projection 94a is inserted into the first guide groove 86a, and the second drive side projection 94b is inserted into the second guide groove 86b. Then, the spring 96 of the link device 90 is fitted into the coil spring 73, and one end of the coil spring 73 is attached to the link device 90. Then, the link device 90 is pushed into the drive side cylindrical portion 82a against the biasing force of the coil spring 73 until when the first drive side projection 94a and the second drive side projection 94b are positioned to the communication portion 84 that causes the first guide groove 86a and the second guide groove 86b and the drive side grooves 85 to communicate into each other.

In the image forming apparatus 1000 according to the present embodiment, in order to enhance a reduction in size of the image forming apparatus 1000 in the axial direction, it is expected that the length of the link device 90 is as small as possible. Therefore, in the present embodiment, a length L1 illustrated in FIG. 4C, which extends from an end portion of the first drive side projection 94a and the second drive side projection 94b on a side facing the driven side spherical portion 92 (hereinafter, referred to as a "driven side end portion") to an end portion of the driven side projections 95a on a side facing the drive side spherical portion 91 (hereinafter, referred to as a "drive side end portion"), is smaller than a length L3 illustrated in FIG. 9B, which extends from the coupling side end portion (i.e., the end portion on the side facing the coupling member 41) of the drive side cylindrical portion 82 to the communication portion 84.

By setting the length L1 to be shorter than the length L3, the driven side projections 95a reach the coupling side end portion of the drive side cylindrical portion 82 before the first drive side projection 94a reaches the communication portion 84. In the present embodiment, however, the photoconductor gear 82 has the undercut 88 that is recessed toward the inner side of the drive side cylindrical portion 82a. Further, as illustrated in FIG. 4C, the diameter A of the driven side spherical portion 92 is equal to the diameter B of the drive side spherical portion 91 and is equal to or smaller than the inner diameter of the drive side opening 87, so that the driven side spherical portion 92 can be inserted into the drive side opening 87.

Accordingly, the driven side spherical portion 92 is inserted into the drive side opening 87. Further, the driven side projections 95a are inserted into the undercut 88 without abutting the coupling side end portion of the drive side cylindrical portion 82a of the photoconductor gear 82. Therefore, the driven side projections 95a can be relieved to the inside of the drive side cylindrical portion 82a deeper than the stopper 85a.

As illustrated in FIG. 9B, a length L2 that extends from the bottom surface of the undercut 88 to the communication portion 84 is equal to or smaller than the length L1. Therefore, when the link device 90 is inserted into the drive side cylindrical portion 82 until the driven side projection 95a abuts against the bottom surface of the undercut 88, the first drive side projection 94a and the second drive side projection 94b can reach the communication portion 84 that communicates the guide groove and the drive side groove 85.

After the link device 90 has been inserted until the first drive side projection 94a and the second drive side projection 94b is located to the communication portion 84, the link device 90 is rotated in the clockwise direction, as indicated by arrow in FIGS. 9A and 9B. Then, the first drive side projection 94a and the second drive side projection 94b are moved to the drive side groove 85 via the communication portion 84.

In the present embodiment, there are two configurations in order to move the first drive side projection 94a and the second drive side projection 94b from the guide groove to the drive side groove 85 by rotating the link device 90. Specifically, the driven side projections 95a is shifted from a predetermined phase by an angle of 90 degrees in the rotation direction with respect to the positions of the first drive side projection 94a and the second drive side projection 94b. Further, as illustrated in FIG. 9A, when the first drive side projection 94a and the second drive side projection 94b are moved to the drive side groove 85, the undercut 88 is extended in a direction in which the link device 90 is rotated (i.e., the clockwise direction in FIG. 9A).

When the positions of the driven side projections 95a and the positions of the first drive side projection 94a and the second drive side projection 94b are equal to each other in the rotation direction, when the link device 90 is inserted until the first drive side projection 94a and the second drive side projection 94b are brought to be located at the communication portion 84, the driven side projections 95a are inserted into the first guide groove 86a and the second guide groove 86b. In this case, even when the link device 90 is rotated to move the first drive side projection 94a and the second drive side projection 94b to the drive side groove 85, the driven side projections 95a contacts a wall that partitions the first guide groove 86a and the second guide groove 86b and the drive side groove 85, and therefore the link device 90 cannot be rotated. Accordingly, when the first drive side projection 94a and the second drive side projection 94b are located at the same position in the rotation direction, the link device 90 cannot be assembled to the photoconductor gear 82. In order to address this inconvenience, in the present embodiment, the driven side projections 95a are shifted from the predetermined phase by the angle of 90 degrees in the rotation direction with respect to the first drive side projection 94a and the second drive side projection 94b. It is applicable that the positional shift of the driven side projections 95a is shifted from the first drive side projection 94a and the second drive side projection 94b in the rotation direction by an angle of rotation (an angle θ1 in FIG. 9A) of the link device 90 or greater. It is to be noted that the angle θ1 is an angle provided when the first drive side projection 94a and the second drive side projection 94b are moved from the guide groove to the drive side groove 85.

Further, the undercut 88 is extended in the direction in which the link device 90 is rotated (i.e., the clockwise direction in the drawing) when the first drive side projection 94a and the second drive side projection 94b are moved to the drive side groove 85. Therefore, when the link device 90 is rotated to move the first drive side projection 94a and the second drive side projection 94b to the drive side groove 85, the driven side projections 95a move in the clockwise direction in the undercut 88. Accordingly, the driven side projections 95a can be relieved in the rotation direction. Therefore, the first drive side projection 94a and the second drive side projection 94b can be moved to the drive side groove 85 without hindering rotation of the link device 90.

In the present embodiment, the undercut 88 is extended to the guide groove. However, the length of the extension is not limited thereto but it is acceptable that the link device 90 is rotated by the angle θ1 as illustrated in FIG. 9A and the length is extended to a size of a width of the drive side groove.

Then, the first drive side projection 94a and the second drive side projection 94b are moved to the drive side grooves 85 through the communication portion 84. When the first drive side projection 94a and the second drive side projection 94b abut against side surfaces of the drive side grooves 85 and the rotation of the link device 90 is regulated, the link device 90 is released from the hand. Then, the link device 90 is moved toward the coupling member side by the biasing force of the coil spring 73, and the first drive side projection 94a and the second drive side projection 94b are inserted into the drive side grooves 85. Accordingly, the link device 90 is attached to the photoconductor gear 82. Then, the photoconductor gear 82 to which the link device 90 is attached is attached to a far side plate 1b of the apparatus body 1 via a bearing 100 (see FIG. 3).

As described above, in the present embodiment, even when the length L1 that extends from the driven side end portion of the first drive side projection 94a and the second drive side projection 94b to the drive side end portion of the driven side projections 95a is made smaller than the length L3 that extends from the coupling side end portion of the drive side cylindrical portion 82 to the communication portion 84, the link device 90 can be assembled to the photoconductor gear 82. By so doing, the length of the link device 90 in the axial direction can be smaller, and thereby reducing the size of the image forming apparatus 1000 in the axial direction.

When being inserted in to the drive side groove 85, the first drive side projection 94a and the second drive side projection 94b are disposed facing the stopper 85a. Therefore, the link device 90 is prevented from being pulled out from the photoconductor gear 82. In the above-described comparative configuration, after the link device is assembled to the photoconductor gear, the stopper is secured to the photoconductor gear by snap-fit connection. By so doing, the link device is prevented from being pulled out from the photoconductor gear. Accordingly, the comparative drive transmission device includes an additional stopper or stoppers, and therefore leads to an increase in costs due to the increased number of parts and components. In addition, an increase in assembly man-hours leads to an increase in manufacturing costs.

By contrast, in the present embodiment, the photoconductor gear 82 is provided with the stoppers 85a, and therefore the number of components can be reduced and cost reduction of the device can be achieved, compared with a case where stopper members are provided separately from a photoconductor gear. Further, reduction of assembly man-hours can be achieved and manufacturing cost reduction can be achieved.

An interval width W1 (i.e., the width of the undercut 88) from the leading end of the improper insertion preventing projection 88a to the drive side opening 87 is greater than the height h1 of the driven side projections 95a and is smaller than the height h2 of the first drive side projection 94a. The relation can be expressed as h1<W1<h2. Accordingly, as illustrated in FIG. 9A, when the link device 90 is assembled to the photoconductor gear 82 properly, the driven side projections 95a is inserted into the undercut 88 so that the driven side projections 95a is disposed facing the improper insertion preventing projection 88a.

Figure 10:
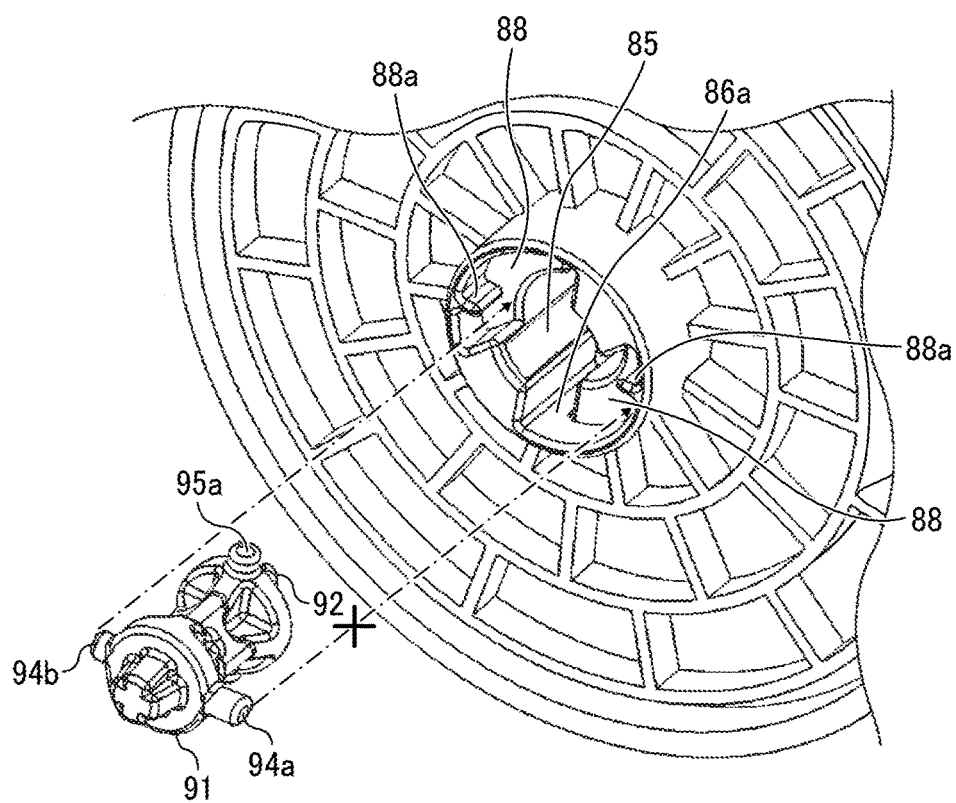
FIG. 10 is a perspective view illustrating a state in which the driven side spherical portion of the link device is attached to the photoconductor gear.

FIG. 10 is a perspective view illustrating a state in which the driven side spherical portion 92 of the link device 90 is inserted into the photoconductor gear 82.

As illustrated in FIG. 10, when the driven side spherical portion 92 is to be inserted into the drive side cylindrical portion 82a wrongly, the first drive side projection 94a that has a height greater than the interval width W1 contacts against the improper insertion preventing projection 88a. Consequently, the first drive side projection 94a and the second drive side projection 94b cannot be inserted into the undercut 88. Accordingly, the link device 90 cannot be inserted into the drive side cylindrical portion 82a before the driven side projections 95a reach the communication portion 84, and therefore the driven side projections 95a cannot be inserted into the drive side groove 85. Therefore, when the driven side spherical portion 92 is wrongly inserted into the drive side cylindrical portion 82a, the link device 90 cannot be assembled to the photoconductor gear 82. Accordingly, improper assembly of the link device 90 can be prevented.

In the above description, the improper insertion preventing projection 88a is provided to make the width of a part of the undercut 88 narrower or smaller than the height h2 of the first drive side projection 94a. However, the configuration is not limited thereto and a configuration in which the entire width of the undercut 88 is narrower or smaller than the height h2 of the first drive side projection 94a is also applied to this disclosure.

Figure 11A:
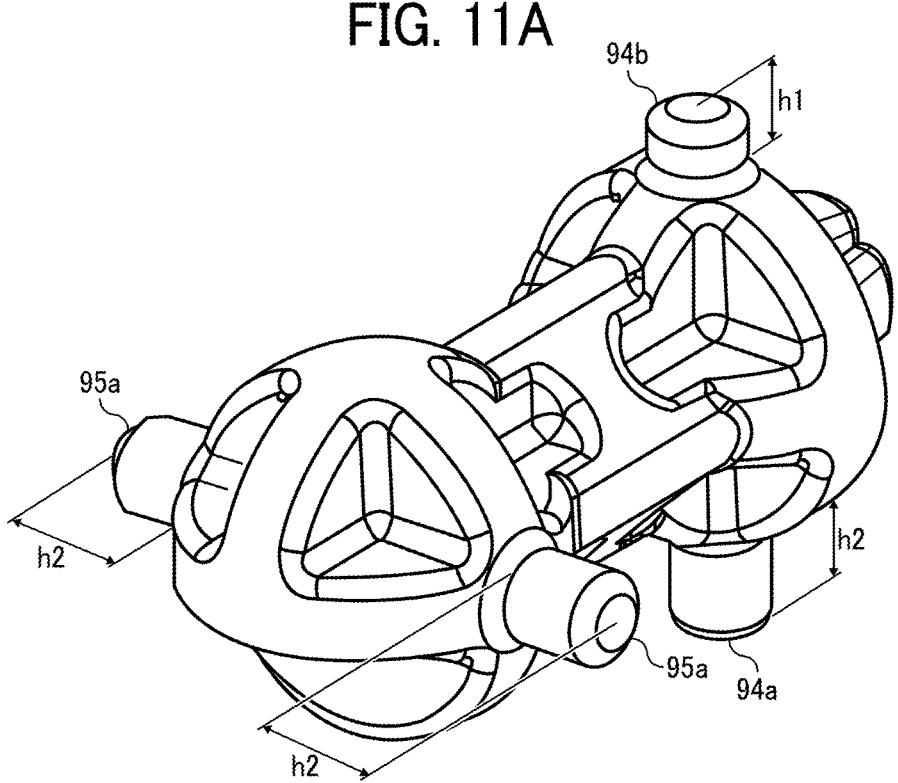
FIGS. 11A and 11B are diagrams illustrating a variation to prevent improper assembly of the link device.
Figure 11B:
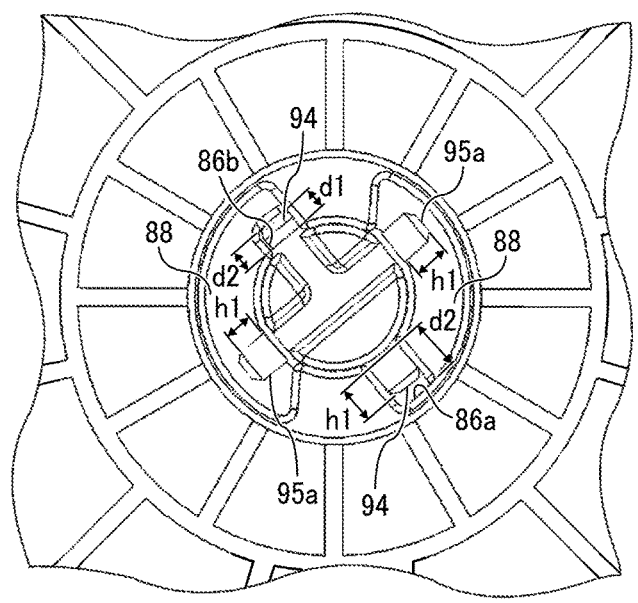

FIGS. 11A and 11B are diagrams illustrating a variation to prevent improper assembly of the link device 90.

In this variation, as illustrated in FIG. 11A, each height of the driven side projections 95a is set to be the same as the height h2 of the first drive side projection 94a. According to this configuration, when the driven side spherical portion 92 is brought to be inserted into the drive side cylindrical portion 82a, the driven side projections 95a are prohibited from being inserted into the second guide groove 86b. Accordingly, improper assembly of the link device 90 is prevented.

Further, the respective diameters of the driven side projections 95a may be set greater than the width of the first guide groove 86a and the second guide groove 86b. According to this configuration, the driven side projections 95a cannot be inserted into the first guide groove 86a and the second guide groove 86b. Accordingly, improper assembly of the link device 90 is prevented.

Further, a protruding portion is formed on the side surface of each of the driven side projections 95a. In this state, even when insertion of the driven side projections 95a into the first guide groove 86a and the second guide groove 86b is attempted, the driven side projections 95a are caught by the protruding portion on each of the driven side projections 95a. According to this configuration, improper assembly is prevented by causing the driven side projections 95a to be caught by the protruding portion.

Next, a description is given of attachment of the link device 90 to the photoconductor gear 82.

Figure 12:
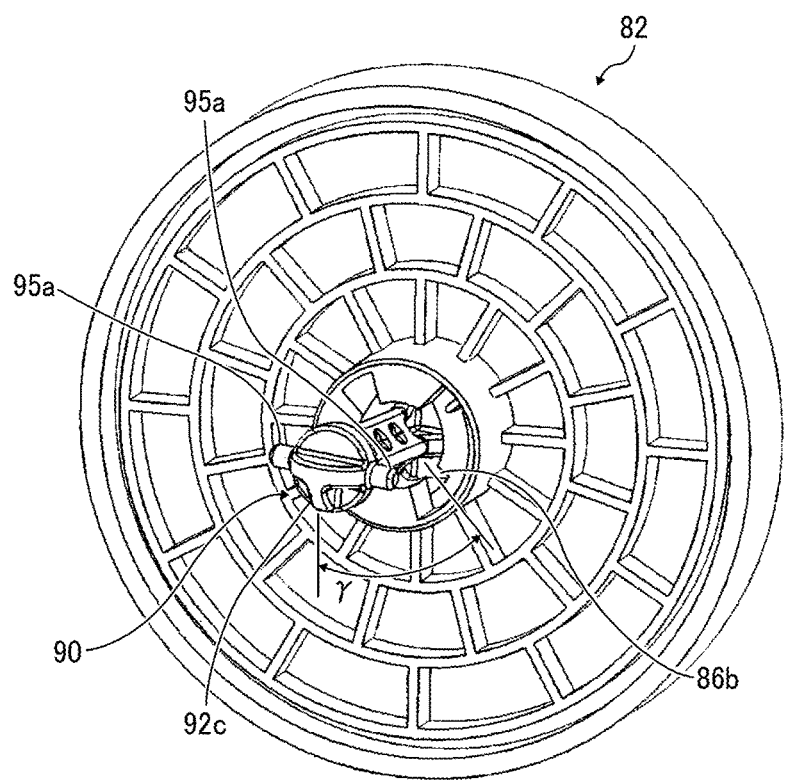
FIG. 12 is a perspective view illustrating a state in which the link device is attached to the photoconductor gear.

FIG. 12 is a perspective view illustrating a state in which the link device 90 is attached to the photoconductor gear 82.

As described above, the height of the first drive side projection 94a and the height of the second drive side projection 94b are different from each other and the groove depth of the second guide groove 86b is made shallow. By so doing, no parts but the second drive projection 94b is inserted into the second guide groove 86b. Accordingly, the link device 90 is attached to the photoconductor gear 82 with a specific phase to the photoconductor gear 82. As a result, as illustrated in FIG. 12, the link device 90 is attached to the photoconductor gear 82 such that the third driven side large circle 92c of the driven side spherical portion 92 is located at a position rotated by an angle y in a clockwise direction in FIG. 12 with respect to the second guide groove 86b.

Figure 13:
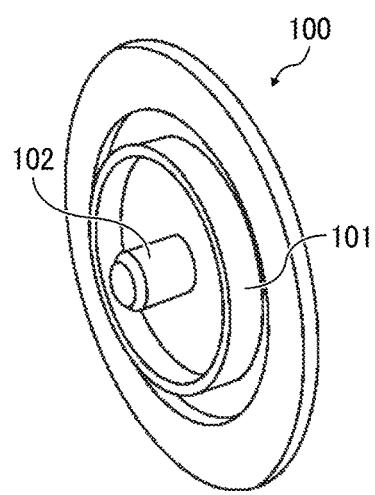
FIG. 13 is a perspective view illustrating a bearing according to an embodiment of this disclosure.

FIG. 13 is a perspective view illustrating the bearing 100.

As illustrated in FIG. 13, the bearing 100 includes a receiver 101 having a cylindrical shape and a regulating projection 102. The receiver 101 has an outer peripheral surface that is fitted into an opening portion of the far side plate 1b of the apparatus body 1, and an inner peripheral surface rotatably receives the drive side cylindrical portion 82a of the photoconductor gear 82.

As illustrated in FIG. 3, the drive side cylindrical portion 82a of the photoconductor gear 82 is inserted into the receiver 101 of the bearing 100 such that the regulating projection 102 of the bearing 100 that is fitted and secured to the opening portion of the far side plate 1b of the apparatus body 1 is inserted into a drive side inserting opening portion 83. Accordingly, the photoconductor gear 82 is rotatably supported by the far side plate 1b of the apparatus body 1 via the bearing 100.

Figure 14:
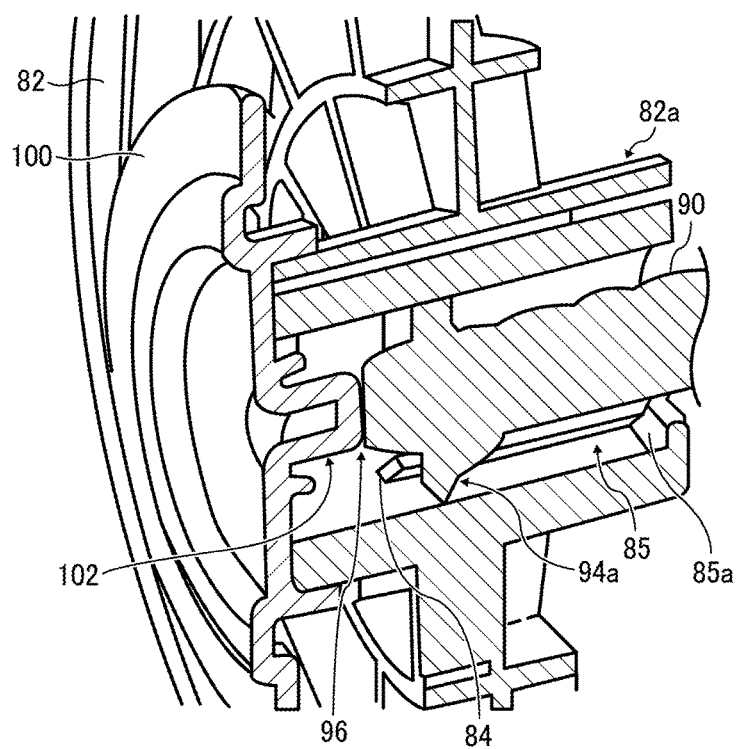
FIG. 14 is a cross sectional perspective view illustrating regulation using a regulating projection of the bearing.

FIG. 14 is a diagram illustrating regulation by the regulating projection 102 of the bearing 100.

As illustrated in FIG. 14, as the link device 90 is pushed into the drive side cylindrical portion 82a of the photoconductor gear 82, the spring 96 of the link device 90 contacts against the regulating projection 102 before the first drive side projection 94a and the second drive side projection 94b reach the communication portion 84. Accordingly, movement of the link device 90 in the axial direction is regulated before the first drive side projection 94a and the second drive side projection 94b in the drive side groove 85 are moved to the communication portion 84. As a result, even when the link device 90 is relatively rotated with respect to the photoconductor gear 82, the first drive side projection 94a and the second drive side projection 94b in the drive side groove 85 are not moved to the first guide groove 86a and the second guide groove 86b through the communication portion 84. Accordingly, after the photoconductor gear 82 is supported by the far side plate 1b through the bearing 100, the link device 90 cannot be pulled out from the photoconductor gear 82.

Figure 15:
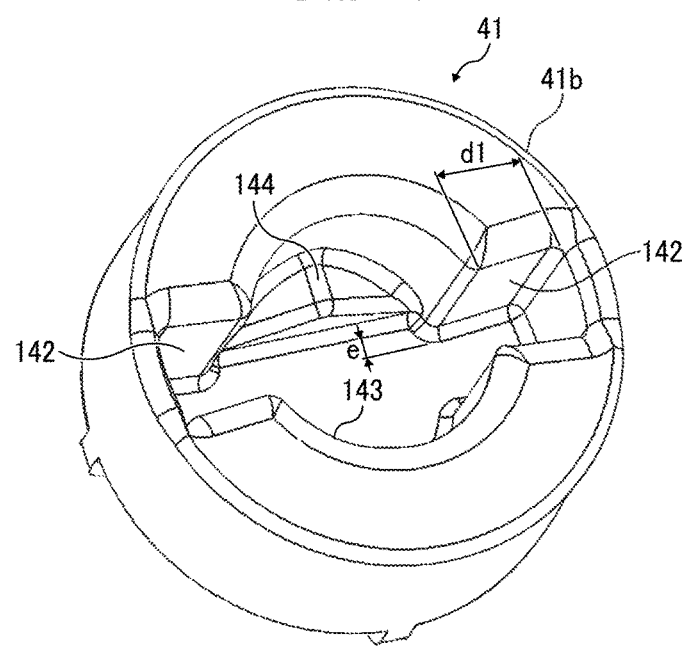
FIG. 15 is a perspective view illustrating a coupling member according to an embodiment of this disclosure.
Figure 16:
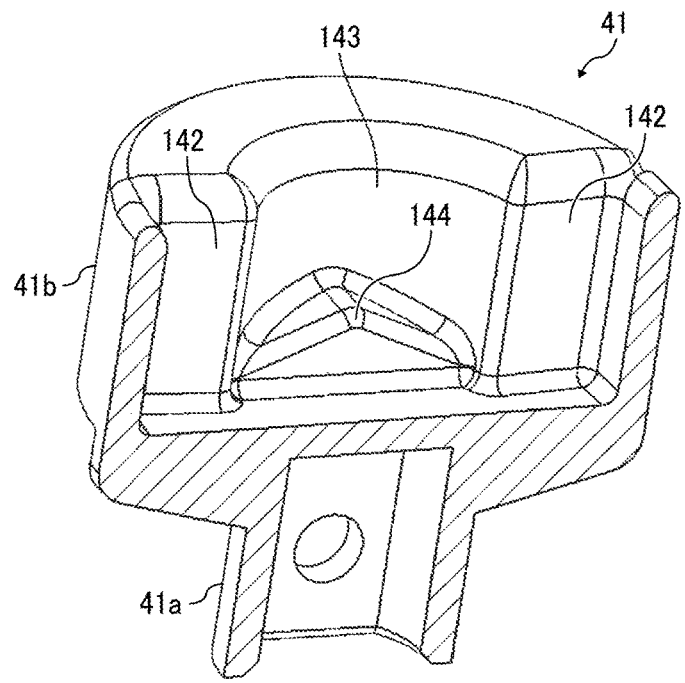
FIG. 16 is a cross sectional perspective view illustrating the coupling member.

FIG. 15 is a perspective view illustrating the coupling member 41. FIG. 16 is a cross section perspective view illustrating the coupling member 41.

The coupling member 41 that functions as a second rotary body includes a shaft inserting portion 41a and the driven side cylindrical portion 41b. It is preferable that the coupling member 41 is formed of a polyacetal resin (POM) having excellent mechanical strength, and good wear resistance and slidability.

The driven side cylindrical portion 41b of the coupling member 41 has an opening facing a drive side, and has a driven side opening 143 into which the driven side spherical portion 92 of the link device 90 is inserted. Further, two driven side grooves 142 are provided in the driven side cylindrical portion 41b at an interval of 180 degrees in the rotation direction. The driven side projections 95a of the link device 90 are inserted into the respective drive side grooves 142. A groove depth d1 of the driven side groove 142 is slightly deeper than the height h1 of each of the driven side projections 95a. Further, a phase matching projection 144 is formed on a bottom surface of the driven side spherical portion 92, at a position shifted from the rotation center.

As illustrated in FIG. 16, the phase matching projection 144 has a mountain shape in which the height becomes gradually lower from a central portion toward an outside. Further, as illustrated in FIG. 15, the phase matching projection 144 is formed up to a position retracted by a length of e mm from the position of the driven side grooves 142.

Figure 17:
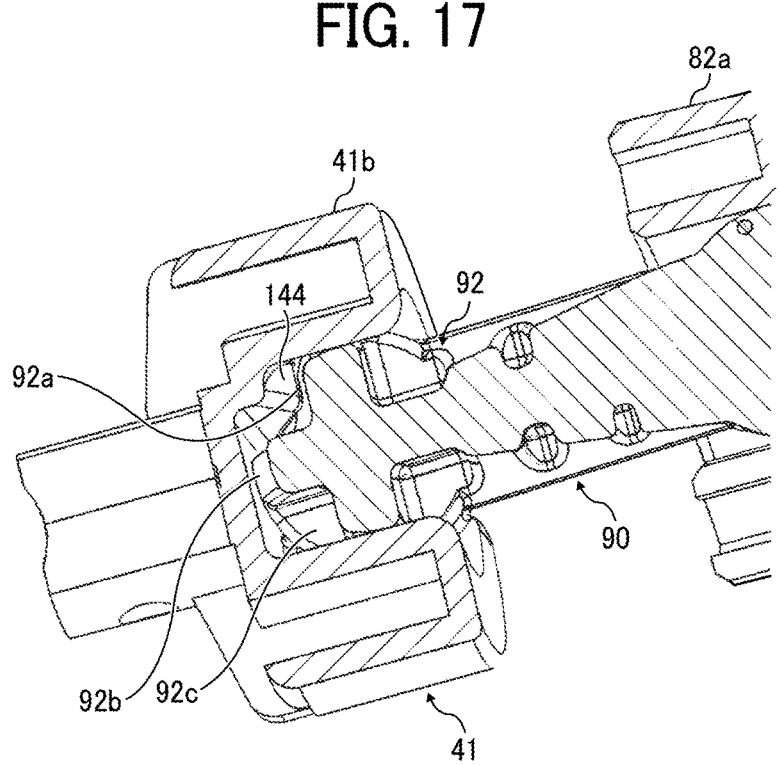
FIG. 17 is a cross sectional perspective view illustrating a state in which the driven side spherical portion of the link device is inserted into a drive side cylindrical portion of the coupling member.

FIG. 17 is a cross sectional view illustrating a state in which the driven side spherical portion 92 of the link device 90 is inserted into the driven side cylindrical portion 41b of the coupling member 41.

When the coupling member 41 and the link device 90 are brought to be linked in a state in which the phase matching projection 144 is positioned in a lower part in FIG. 17, the third driven side large circle 92c of the driven side spherical portion 92 contacts against the phase matching projection 144. As a result, the driven side spherical portion 92 cannot be inserted into the driven side cylindrical portion 41b of the coupling member 41 and the driven side projections 95a cannot be inserted into the driven side grooves 142, and therefore drive transmission cannot be connected. In other words, when the phase in the rotation direction of the phase matching projection 144 is matched with a cut portion 92c1 of the third driven side large circle 92c of the driven side spherical portion 92, the driven side spherical portion 92 is inserted into the driven side cylindrical portion 41b, and the driven side projections 95a are inserted into the driven side grooves 142, so that the drive transmission is connected. That is, in the present embodiment, the phase matching projection 144 and the cut portion 92c1 of the third driven side large circle 92c of the driven side spherical portion 92 configure a second phase matching device 220.

As described above, in the present embodiment, the photoconductor gear 82 and the link device 90 are attached at a predetermined phase, and the drive transmission between the link device 90 and the coupling member 41 is connected at a predetermined phase. As a result, the drive transmission between the photoconductor gear 82 and the coupling member 41 can be linked at a predetermined phase.

As described above, the photoconductor gear 82 is a resin molded item, and the shape cannot become a perfect circle and slightly becomes an elliptical shape because of sink marks, for example. As a result, the photoconductor gear 82 has speed variation of one rotation period. If phases of the speed variation of the photoconductor gears 82 are different among the colors, out of color registration according to the phases is caused, and the color image is affected. To be more specific, in a case in which the photoconductor gear 82 has the speed variation, the photoconductor drum 40 also has speed variation according to the speed variation of the photoconductor gear 82, and therefore the image is expanded and contracted according to the speed variation of the photoconductor drum 40. That is, when the speed of the photoconductor drum 40 is fast, the image to which any image data has been written or transferred is expanded. By contrast, when the speed of the photoconductor drum 40 is slow, the image to which any image data has been written or transferred is contracted. By adjusting the phases of the speed variation of the photoconductor gears 82 of the respective colors such that expanded portions or contracted portions of the images of the colors are superimposed, the out of color registration can be restrained. Phase matching of the photoconductor gears 82 of the colors is performed by, for example, marking a position of a maximum diameter of the photoconductor gear 82, and attaching the photoconductor gears 82 of the colors to the far side plate 1b, using the mark as a landmark.

Further, in the photoconductor drum 40 to which the coupling member 41 is attached, speed variation of one rotation period is caused due to eccentricity of the photoconductor drum 40. Therefore, the phases of the speed variation of the photoconductor drums 40 of the colors are adjusted to assemble the photoconductor drums 40 to the apparatus body 1.

In the present embodiment, the driven side projections 95a are provided at an interval of an angle of 180 degrees in the rotation direction. Therefore, even when the coupling member 41 is rotated by 180 degrees from a state in which the phases of the driven side projections 95a and the phases of the driven side grooves 142 in the rotation direction are matched, the phases of the driven side projections 95a and the phases of the driven side grooves 142 in the rotation direction become matched. As a result, the photoconductor drum 40 may be assembled to the apparatus body 1 in a state in which the phase is shifted with respect to a predetermined phase by an angle of 180 degrees, and out of color registration may be caused.

In order to address this inconvenience, the configuration in the present embodiment includes the phase matching projection 144. Therefore, even when the phases of the driven side projections 95a and the phases of the driven side grooves 142 in the rotation direction are matched, the drive transmission cannot be linked when the third driven side large circle 92c faces the phase matching projection 144. From the state, the coupling member 41 is relatively rotated with respect to the link device 90 by an angle of 180 degrees. By so doing, the driven side spherical portion 92 is inserted into the driven side cylindrical portion 41b, and the drive transmission is connected and linked. Accordingly, the photoconductor drums 40 can be assembled to the apparatus body 1 at a predetermined phase, and the out of color registration can be restrained.

Further, the first drive side projection 94a and the second drive side projection 94b provided at an interval of angle of 180 degrees in the rotation direction. Therefore, in a case in which the height of the first drive side projection 94a, the height of the second drive side projection 94b, the groove depth of the first guide groove 86a, and the groove depth of the second guide groove 86b are made equal, even when the link device 90 is rotated with respect to the photoconductor gear 82 by an angle of 180 degrees from a state in which the phases of the first drive side projection 94a and the second drive side projection 94b and the phases of the first guide groove 86a and the second guide groove 86b in the rotation direction are matched, the phases of the driven side projections 95a and the phases of the driven side grooves 142 in the rotation direction are matched. Therefore, even when the coupling member 41 is linked with the link device 90 at a predetermined phase and the speed variation phases of the photoconductor drums 40 are matched, the phase of the speed variation of the photoconductor gear 82 may be shifted from the predetermined phase by an angle of 180 degrees. However, in the present embodiment, the height of the first drive side projection 94a and the height of the second drive side projection 94b are different from each other, and therefore the first drive side projection 94a cannot be inserted into the second guide groove 86b. Accordingly, the rotation speed phase of the photoconductor gear 82 can be prevented from being shifted from the speed variation of another photoconductor gear 82 by an angle of 180 degrees, and therefore the out of color registration can be restrained.

When a unit including the photoconductor drum 40 is inserted into the apparatus body 1 of the image forming apparatus 1000, in a case in which the phase of the coupling member 41 that is attached to the photoconductor drum shaft 40a does not match with the phase of the link device 90, the driven side projections 95a contact the edge portion of the driven side cylindrical portion 41b of the coupling member 41 or the third driven side large circle 92c contacts the phase matching projection 144.

In the present embodiment, the link device 90 can move in a predetermined area of the drive side cylindrical portion of the photoconductor gear 82. Therefore, in a case in which the unit including the photoconductor drum 40 is inserted into the apparatus body 1 in a state in which the driven side projections 95a contact the edge portion of the driven side cylindrical portion 41b of the coupling member 41 or the third driven side large circle 92c contacts the phase matching projection 144, the link device 90 moves to the far side of the apparatus body 1 while pressing the coil spring 73. Accordingly, even when the drive transmission is not linked between the coupling member 41 and the link device 90, the unit including the photoconductor drum 40 can be inserted into the apparatus body 1 of the image forming apparatus 1000.

Further, in the present embodiment, in the case in which the phase of the coupling member 41 that is attached to the photoconductor drum shaft 40a does not match with the phase of the link device 90, the communication portion 84 is provided inside the predetermined area in which the link device 90 is moved by the coupling member 41. Therefore, even when the assembly is performed in the state in which the phase of the coupling member 41 does not match with the phase of the link device 90, the first drive side projection 94a and the second drive side projection 94b do not move to the first guide groove 86a and the second guide groove 86b, respectively, from the drive side groove 85 via the communication portion 84.

As the link device 90 is rotated together with rotation of the photoconductor gear 82, the phases of the drive side projections 95a match with the phase of the driven side groove 142. Then, the coupling of the third driven side large circle 92c and the phase matching projection 144 is released (uncoupled), so that the phase of the link device 90 and the phase of the coupling member 41 match with each other. Consequently, the link device 90 moves to the coupling member 41 by the biasing force applied by the coil spring 73, the driven side spherical portion 92 is inserted into the driven side opening 143, and the driven side projections 95a is inserted into the driven side groove 142. Accordingly, the drive transmission of the link device 90 and the coupling member 41 is connected with the predetermined phase, and the driving force is transmitted from the link device 90 to the coupling member 41.

When there is a gap between the rotation center of the photoconductor gear 82 and the rotation center of the photoconductor drum shaft 40a (hereinafter, the gap is referred to as a shaft center gap), the link device 90 is inclined to connect and link the drive transmission, as illustrated in FIG. 3. In the present embodiment, the drive side spherical portion 91 of the link device 90 that is inserted into the drive side cylindrical portion 82a of the photoconductor gear 82 and the driven side spherical portion 92 of the link device 90 that is inserted into the driven side cylindrical portion 41b of the coupling member 41 have spherical shapes. Accordingly, in a case in which there is the shaft center gap, the link device 90 can be smoothly inclined, and the shaft center gap can be preferably absorbed. To be more specific, the arc-shaped surfaces of the first drive side large circle 91a, the second drive side large circle 91b, and the third drive side large circle 91c of the drive side spherical portion 91 that are inserted into the drive side cylindrical portion 82a of the photoconductor gear 82 smoothly slide on the inner peripheral surface of the drive side opening 87, and the link device 90 is smoothly inclined with respect to the photoconductor gear 82. Further, the arc-shaped surfaces of the first drive side large circle 92a, the second drive side large circle 92, and the third driven side large circle 92c of the driven side spherical portion 92 that are inserted into the driven side cylindrical portion 41b of the coupling member 41 smoothly slide on the inner peripheral surface of the driven side opening 143 and the bottom surface of the driven side cylindrical portion 41b, and the link device 90 is smoothly inclined with respect to the coupling member 41. Accordingly, the link device 90 is smoothly inclined and can absorb the shaft center gap.

Figure 18A:
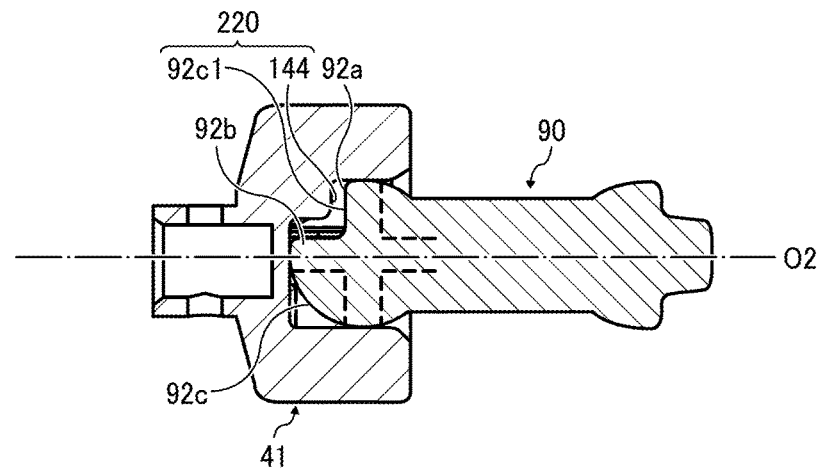
FIGS. 18A, 18B, and 18C are cross sectional views illustrating the coupling member and the link device, cut in a direction perpendicular to a protruding direction of a driven side projection of the link device.
Figure 18B:
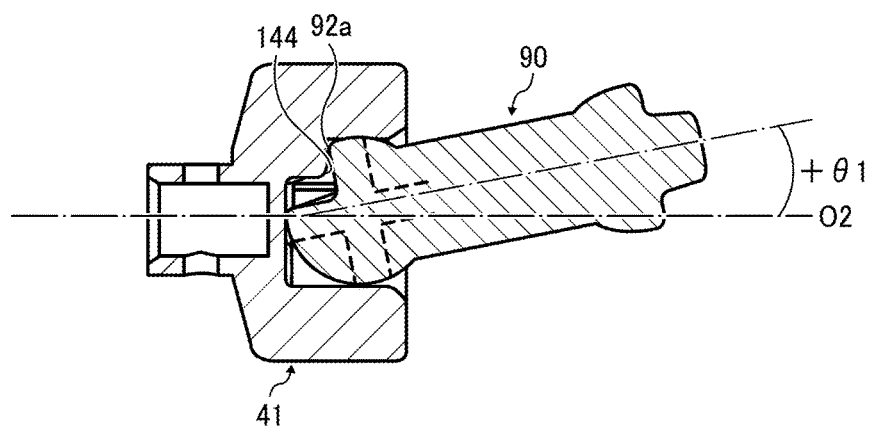
Figure 18C:
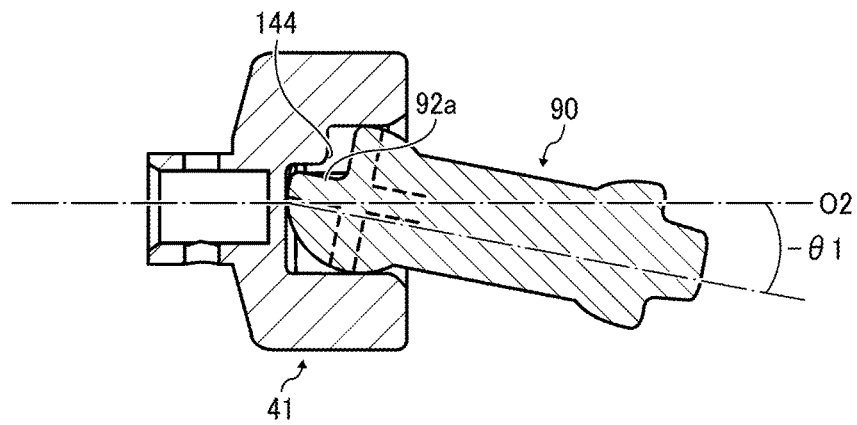

FIGS. 18A, 18B, and 18C are cross-sectional views of the coupling member 41 and the link device 90 cut in the direction perpendicular to the protruding direction of the driven side projection 95a.

As illustrated in FIG. 18A, when the link device 90 is not inclined, the phase matching projection 144 has a height having a predetermined gap with respect to a side surface of the first driven side large circle 92a. This gap causes the first driven side large circle 92a not to come in contact with the phase matching projection 144 even when the link device 90 is inclined by a maximum inclination angle +θ1, the maximum inclination angle being in the direction perpendicular to the protruding direction of the driven side projections 95a of the link device 90, as illustrated in FIG. 18B.

Further, as illustrated in FIG. 15, the phase matching projection 144 is not formed up to the position flush with the side surface of the driven side groove 142, and is retracted by e mm from the side surface of the driven side groove 142. Therefore, when the link device 90 is not inclined, as illustrated in FIG. 18A, the predetermined gap is formed between the side surface of the phase matching projection 144 and the side surface of the second driven side large circle 92b. This gap causes the second driven side large circle 92b not to come in contact with the phase matching projection 144, even when the link device 90 is inclined by the maximum inclination angle −θ1, the maximum inclination angle being in the direction perpendicular to the protruding direction of the driven side projection 95a of the link device 90, as illustrated in FIG. 18C.

Figure 19A:
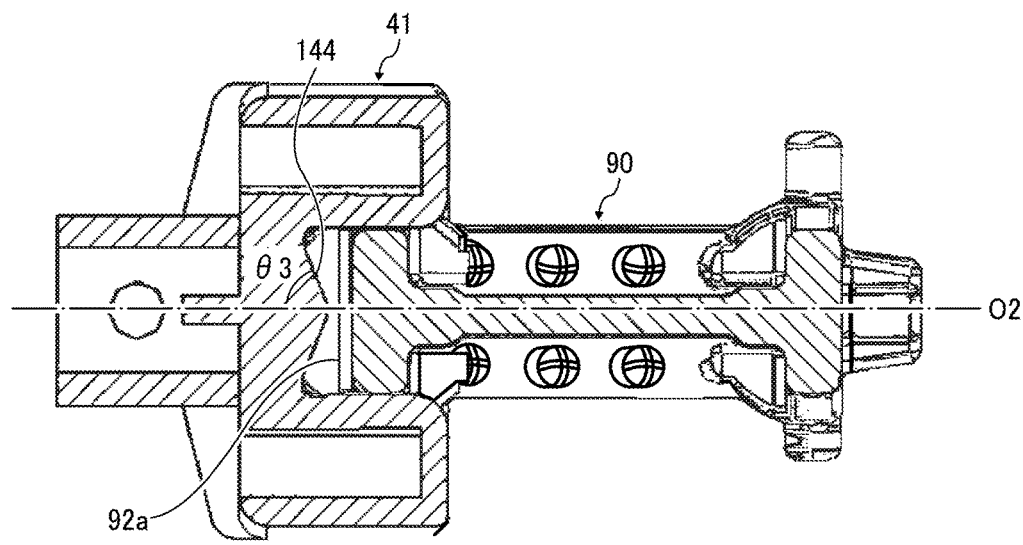
FIGS. 19A, 19B, and 19C are cross sectional views illustrating the coupling member and the link device, cut in a direction parallel to the protruding direction of the driven side projection of the link device.
Figure 19B:
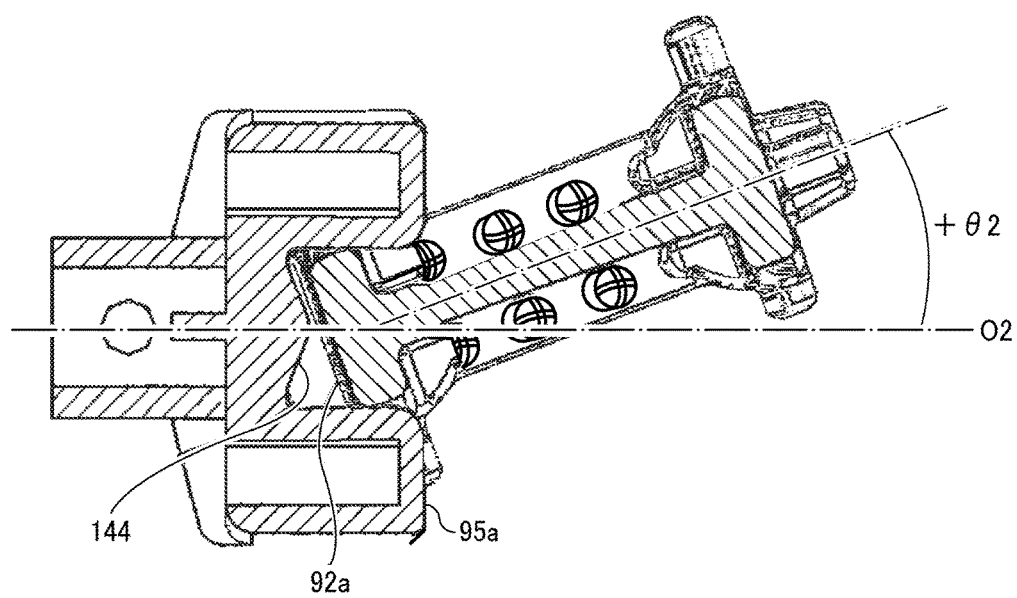
Figure 19C:
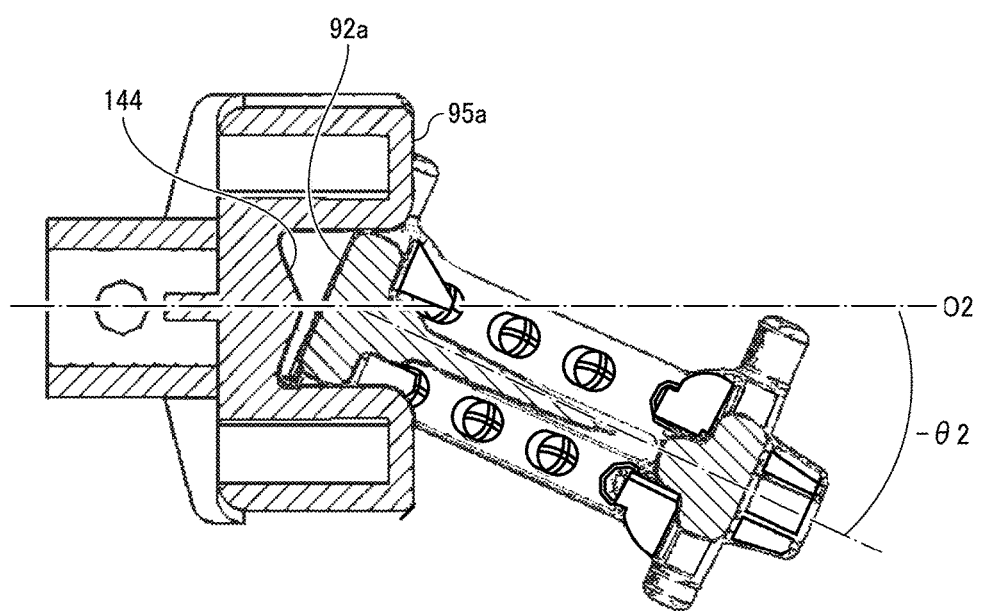

FIGS. 19A, 19B, and 19C are cross-sectional views of the coupling member 41 and the link device 90, cut in a direction parallel to the protruding direction of the driven side projections 95a of the link device 90.

The phase matching projection 144 has a mountain shape where the height of the cross section becomes lower from the center toward a distal end portion, as illustrated in FIG. 19A. Then, an inclination angle θ3 of an inclined surface of the phase matching projection 144 is set to an angle that causes the side surface of the first driven side large circle 92a not to abut against the phase matching projection 144, when the link device 90 is inclined by a maximum inclination angle θ2 in a direction parallel to the protruding direction of the driven side projection 95a, as illustrated in FIGS. 19B and 19C.

As described above, in the present embodiment, the phase matching projection 144 does not impede inclination of the link device 90, and thus the shaft center gap can be preferably absorbed by the link device 90. It is to be noted that the maximum inclination angle of the link device 90 is an angle of when the inclination is regulated due to abutment of the linking member 93 of the link device 90 against the coupling member 41 at the edge portion of the driven side cylindrical portion 41b of the coupling member 41 or against the photoconductor gear 82 at the edge portion of the drive side cylindrical portion 82a of the photoconductor gear 82.

It is to be noted that a reference letter "O2" indicates a shaft core of the coupling member 41 in FIGS. 18A, 18B, 18C, 19A, 19B, and 19C. Specifically, FIGS. 18A through 18C indicate that, even when the link device 90 is inclined by an angle of +θ1 or −θ1, the second driven side large circle 92*b* does not contact with the phase matching projection 144. Further, FIGS. 19A through 19C indicated that, even when the link device 90 is inclined by an angle of +θ2 or −θ2, the side surface of the first driven side large circle 92*a* does not abut against the phase matching projection 144.

Further, the configuration to match the phase of the driven side (the phases between the coupling member 41 and the link device 90) may be caused to be the same configuration as the configuration to match the phase of the drive side (the phases between the photoconductor gear 82 and the link device 90). That is, the lengths of the driven side projections 95*a* are differentiated from each other and the groove depths of the driven side grooves 142 are differentiated from each other. Therefore, the driven side projections 95*a* is not inserted into any groove other than the predetermined driven side grooves 142.

Further, in the present embodiment, the first drive side projection 94*a* and the second drive side projection 94*b* of the link device 90 that receive the driving force transmitted from the photoconductor gear 82, and the driven side projections 95*a* that transmit the driving force to the coupling member 41 have columnar shapes. Accordingly, the projections of the present embodiment (i.e., the first drive side projection 94*a*, the second drive side projection 94*b*, and the driven side projections 95*a*) are more restrained from the angular speed variations when compared with a comparative configuration in which the drive side projections and the driven side projections have hemisphere shapes. Now, a specific description is given using the drawings as follows.

Figure 20A:
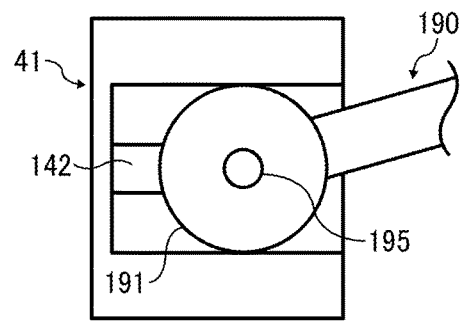
FIGS. 20A, 20B, and 20C are diagrams illustrating a drive transmission operation of a link device and a coupling member of a comparative drive transmission device.
Figure 20B:
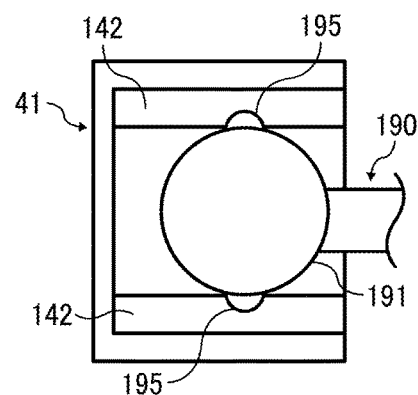
Figure 20C:
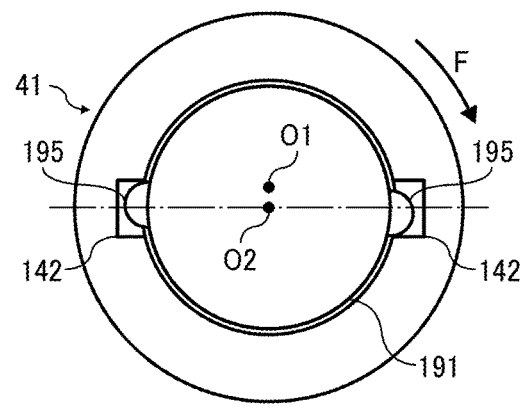
Figure 21A:
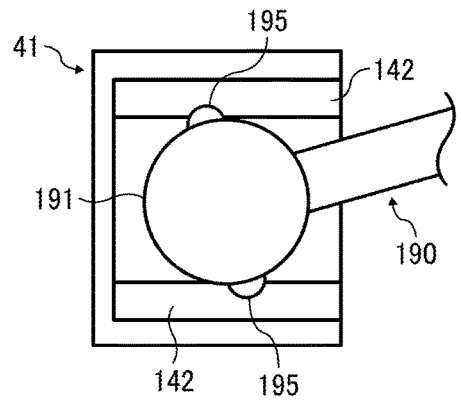
FIGS. 21A, 21B, and 21C are diagrams illustrating states in which the link device and the coupling member of the comparative drive transmission device are rotated by an angle of 90 degrees from the states of FIGS. 20A, 20B, and 20C, respectively.
Figure 21B:
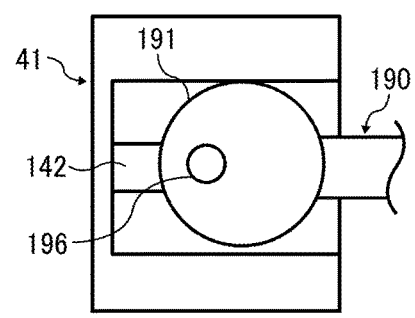
Figure 21C:
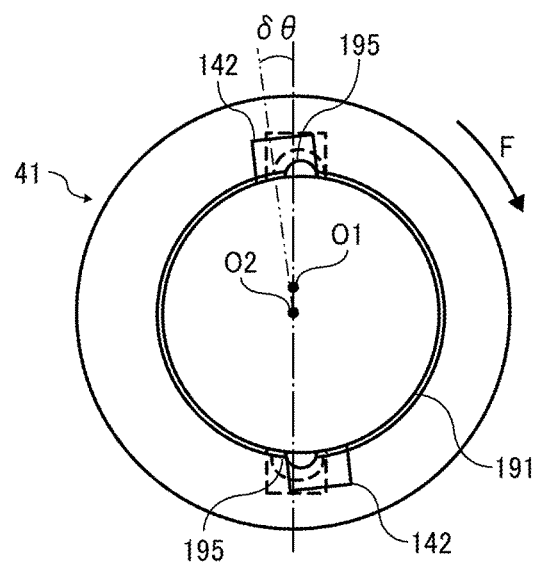

FIGS. 20A, 20B, and 20C are diagrams illustrating a drive transmission operation of a link device 90 and a coupling member of a comparative drive transmission device. FIG. 20A is a schematic view as viewed from a direction perpendicular to an inclination direction of the link device. FIG. 20B is a schematic view as viewed from above FIG. 20A. FIG. 20C is a schematic view as viewed from an axial direction. Further, FIGS. 21A, 21B, and 21C are diagrams illustrating states in which the link device and the coupling member of the comparative drive transmission device are rotated by an angle of 90 degrees from the states of FIGS. 20A, 20B, and 20C, respectively. FIG. 21A is a schematic view as viewed from the direction perpendicular to the inclined direction of the link device. FIG. 26B is a schematic view as viewed from above FIG. 21A. FIG. 21C is a schematic view as viewed from the axial direction.

It is to be noted that, in FIGS. 20A, 20B, 20C, 21A, 21B, and 21C, a reference letter "O2" indicates the shaft core of the coupling member 41, a reference letter "O1" indicates a shifted shaft core, and reference numeral "191" indicates a shape of a coupled portion formed by coupling of the coupling member 41 and a link device 190.

In a case in which the driven side projections 195 have a hemisphere shape, each of the driven side projection 195 forms an arc shape in which a downstream end of the rotation direction of the driven side projection 195, which is a groove abutting place abutting against a side surface of a driven side groove 142, is positioned to an upstream side of the rotation direction, as going to the top, as illustrated in FIG. 20C. As illustrated in FIGS. 20A through 20C, when the protruding direction of the driven side projections 195 is a direction perpendicular to a shaft center gap direction, substantially the entire driven side projections 195 enter the driven side grooves 142. Therefore, in this case, driven side spherical portion sides of the driven side projections 195 abut against respective side surfaces of the driven side grooves 142, as illustrated in FIG. 20C.

From this state, when the link device 190 is rotated in arrow F direction in FIG. 20C, the left driven side projection 195 of FIG. 20C is moved in the driven side groove 142 in the axial direction in a direction of being separated from a photoconductor gear, and the right driven side projection 195 of FIG. 20C is moved in the driven side groove 142 in the axial direction in a direction of approaching the photoconductor gear. At this time, as entering amounts of the driven side projections 195 to the driven side grooves 142 are decreased, and the abutting positions of the driven side projections 195 against the driven side groove side surfaces are changed to the top side. In the case in which the driven side projections 195 have a hemisphere shape, the downstream end of the rotation direction of the driven side projection 195, which abuts against the driven side groove 142, is positioned to the upstream side of the rotation direction, as going to the top, as described above. Therefore, as illustrated in FIG. 21C, even when the link device 190 is rotated by an angle of 90 degrees, the coupling member 41 is not rotated by an angle of 90 degrees and is positioned at a position retracted in the rotation direction by an angle δθ, and the angular speed of the coupling member 41 is delayed from the angular speed of the link device 190.

Then, when the link device 190 is further rotated in arrow F direction in FIG. 21C from the state of FIGS. 21A through 21C, the driven side projection 195 positioned at the upper side in FIG. 21A is moved in the driven side groove 142 in the axial direction to approach the photoconductor gear. Further, the driven side projection 195 positioned at a lower side in FIG. 21A is moved in the driven side groove 142 in the axial direction in a direction away from the photoconductor gear. At this time, the abutting positions of the driven side projections 195 against the driven side groove side surfaces are changed from the top side to the driven side spherical portion sides. When the link device 190 is rotated by an angle of 90 degrees from the state of FIGS. 21A through 21C and rotated by an angle of 180 degrees in total, a state after the rotation becomes the same as the state of FIGS. 20A through 20C, except that the positions of the driven side projections 195 and the driven side grooves 142 are switched. At this time, the delay of the coupling member 41 is canceled and is rotated by an angle of 180 degrees, similarly to the link device 190. That is, while the coupling member 41 is rotated by an angle of 90 degrees from the state of FIGS. 21A through 21C, the coupling member 41 is rotated more by the angle δθ, and the angular speed becomes faster than the link device 190. Accordingly, in the case in which the driven side projections have a hemisphere shape, the angular speed variation of a half (½) rotation period is caused.

In the above description, the speed variation between the link device 190 and the coupling member 41 has been described. However, in a case in which the drive side projections have a hemisphere shape, the link device 190 has speed variation in a half (½) period between the photoconductor gear and the link device 190.

Figure 22A:
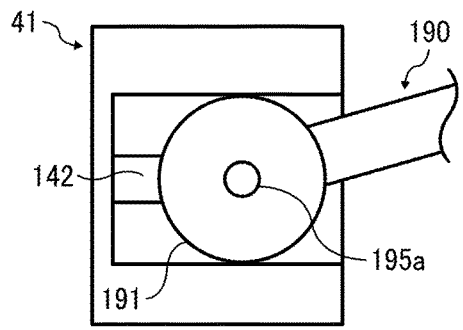
FIGS. 22A, 22B, and 22C are diagrams illustrating a drive transmission operation of the link device and the coupling member of the drive transmission device according to an embodiment of this disclosure.
Figure 22B:
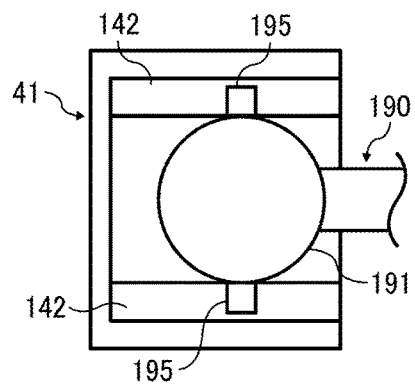
Figure 22C:
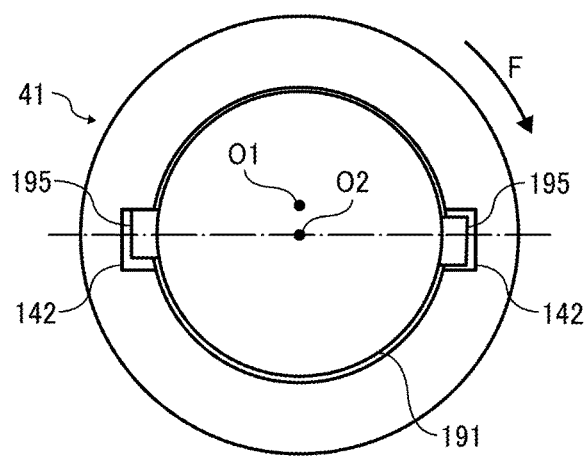
Figure 23A:
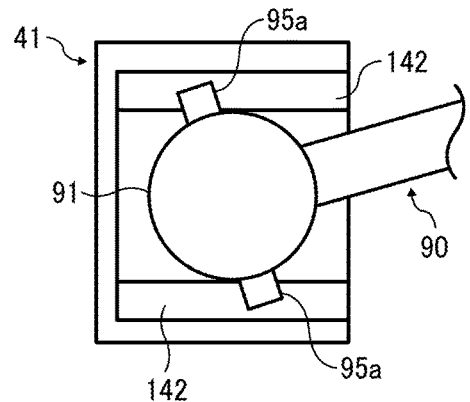
FIGS. 23A, 23B, and 23C are diagrams illustrating states in which the link device and the coupling member of the drive transmission device are rotated by an angle of 90 degrees from the states of FIGS. 22A, 22B, and 22C, respectively.
Figure 23B:
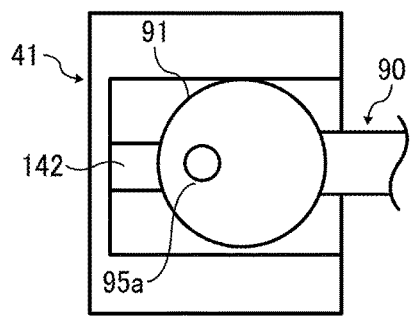
Figure 23C:
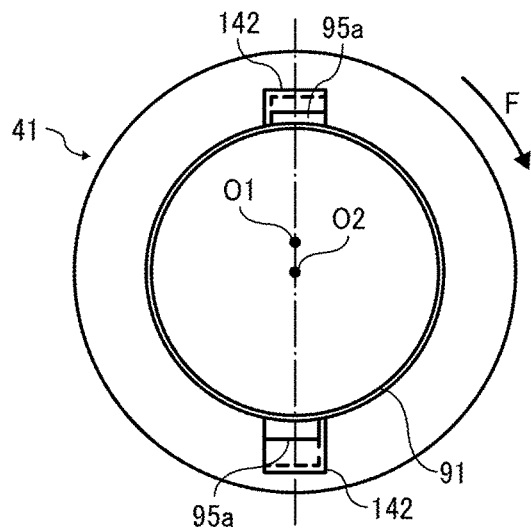

FIGS. 22A, 22B, and 22C are diagrams illustrating a drive transmission operation of the link device 90 and the coupling member 41 of the drive transmission device 70 according to an embodiment of this disclosure. FIG. 22A is a schematic view as viewed from a direction perpendicular to the inclined direction of the link device 90. FIG. 22B is a schematic view as viewed from above FIG. 22A. FIG. 22C is a schematic view as viewed from the axial direction. Further, FIGS. 23A, 23B, and 23C are diagrams illustrating states in which the link device and the coupling member of the comparative drive transmission device are rotated by an angle of 90 degrees from the states of FIGS. 22A, 22B, and 22C, respectively. FIG. 23A is a schematic view as viewed from the direction perpendicular to the inclined direction of the link device. FIG. 23B is a schematic view as viewed from above FIG. 23A. FIG. 23C is a schematic view as viewed from the axial direction.

It is to be noted that, in FIGS. 22A, 22B, 22C, 23A, 23B, and 23C, the reference letter "O2" indicates the shaft core of the coupling member 41, the reference letter "O1" indicates the shifted shaft core, and reference numeral "191" indicates the shape of the coupled portion formed by coupling of the coupling member 41 and the link device 190.

In the present embodiment, the driven side projections 95a have a columnar shape. Accordingly, as illustrated in FIG. 22C, downstream side ends of the rotation direction of the driven side projections 95a that function as groove abutting places to abut against side surfaces of the driven side grooves 142 have a linear shape linearly extending in the radial direction. As a result, the groove abutting places of the driven side projections 95a to abut against the driven side grooves 142 remain at the same positions in the rotation direction from the driven side spherical portion 92 side to the top. When the link device 90 is rotated in arrow F direction in FIG. 22C from the state illustrated in FIGS. 22A through 22C, entering amounts of the driven side projections 95a to the driven side grooves 142 are decreased. When the link device 90 is rotated by an angle of 90 degrees, as illustrated in FIG. 23C, the top sides of the driven side projections 95a enter the driven side grooves 142. As a result, the downstream side ends of the rotation direction at the tops of the driven side projections 95a abut against the side surfaces of the driven side groove 142. However, the downstream side ends of the rotation direction of the driven side projections 95a have a linear shape linearly extending in the radial direction. Therefore, even when the downstream side ends of the rotation direction at the tops of the driven side projections 95a solely abut against the side surfaces of the driven side grooves 142, the coupling member 41 is rotated by the same angle as the link device 90 without being delayed from the rotation of the link device 90. Accordingly, even when the shaft center gap is generated, the coupling member 41 can be rotated at a constant speed. Accordingly, the link device 90 can be rotated at a constant speed without causing an angular speed variation in the drive transmission from the link device 90 to the coupling member 41 due to the shape of the projections (i.e., the driven side projections 95a).

Similarly, each of the first drive side projection 94a and the second drive side projection 94b has a columnar shape, and thus the link device 90 can be rotated at a constant speed without causing the angular speed variation in the drive transmission from the photoconductor gear 82 to the link device 90 due to the shape of the projections (i.e., the first drive side projection 94a and the second drive side projection 94b).

Further, in the present embodiment, the first drive side projection 94a, the second drive side projection 94b, and the driven side projections 95a have columnar shapes. By so doing, the downstream end portion of the rotation direction that correspond to groove abutting places abutting against the side surfaces of the drive side groove 85 and the driven side grooves 142 have respective arc surfaces protruding in the rotation direction. As a result, as viewed from the radial direction, the abutting between the first drive side projection 94a, the second drive side projection 94b, and the driven side projections 95a and the drive side groove 85 and the driven side groove 142 becomes point connection, and the link device 90 can be smoothly inclined in the direction perpendicular to the protruding direction of the first drive side projection 94a, the second drive side projection 94b, and the driven side projections 95a, as illustrated in FIG. 22A. It is to be noted that the point connection is an ideal state in design, and includes, in reality, a state having some contact width.

FIG. 24 is a graph illustrating speed variation of a photoconductor drum checked when an axial center of a photoconductor drum shaft is shifted from a rotation shaft of a photoconductor gear 82 by a predetermined amount, using a comparative link device with the drive side projections and the driven side projections having hemisphere shapes. FIG. 25 is a graph of the speed variation of the photoconductor drum 40 checked when the axial center of the photoconductor drum shaft 40a is shifted from the rotation shaft of the photoconductor gear 82 by a predetermined amount, using the link device 90 of the present embodiment with the first drive side projection 94a, the second drive side projection 94b, and the driven side projections 95a having columnar shapes.

It is found that the speed variation of the photoconductor drum 40 according to the present embodiment is equal to or smaller than ±20 (deg./sec.), as shown in the graph of FIG. 25. By contrast, the speed variation of the photoconductor drum of the comparative link device exceeds ±20 (deg./sec.), as shown in the graph of FIG. 24. According to this comparison, by forming the first drive side projection 94a, the second drive side projection 94b, and the driven side projections 95a having the columnar shapes, the speed variation of the photoconductor drum 40 can be sufficiently restrained, compared with the known configuration.

Figure 26:
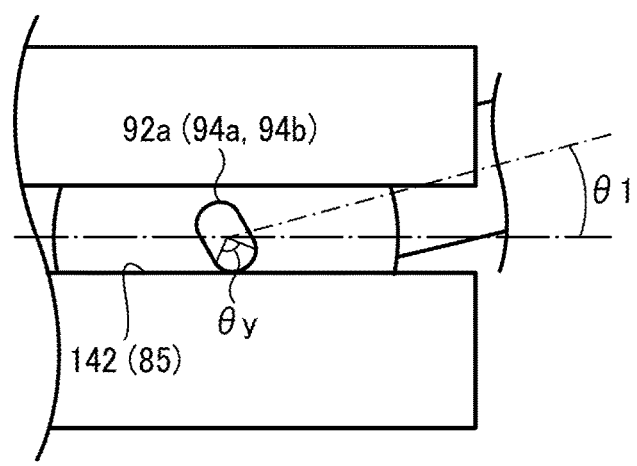
FIG. 26 is a diagram illustrating a variation of a drive side projection and the driven side projection of the link device.

Further, the first drive side projection 94a, the second drive side projection 94b, and the driven side projections 95a may have any shapes as long as the groove abutting places at least abutting against the side surfaces of the grooves (i.e. the grooves 142 and 85) linearly extend in the radial direction and protrude in the rotation direction. Therefore, for example, the first drive side projection 94a, the second drive side projection 94b, and the driven side projections 95a may have a columnar shape having a rectangular shape with rounded corners in cross section, or a columnar shape having an elliptical shape in cross section, as illustrated in FIG. 26.

Further, in a case in which the groove abutting place of the projection (i.e., any one of the first drive side projection 94a, the second drive side projection 94b, and the driven side projections 95a), which abuts against the side surface of the groove (i.e., any one of the drive side groove 85 and the driven side groove 142), has an arc surface, a center angle θy of the arc is set to twice the maximum inclination angle θ1 of the link device 90 in the direction perpendicular to the protruding direction of the projection (i.e., any one of the first drive side projection 94a, the second drive side projection 94b, and the driven side projections 95a) of the link device 90. Therefore, even when the link device 90 is inclined by the maximum inclination angle θ1, the arc surface of the projection (i.e., any one of the first drive side projection 94a, the second drive side projection 94b, and the driven side projections 95a) can abut against the side surface of the groove (i.e., any one of the drive side groove 85 and the driven side groove 142). Accordingly, even when the link device 90 is inclined by the maximum inclination angle θ1, the contact between the groove (i.e., any one of the drive side groove 85 and the driven side groove 142) and the projection (i.e., any one of the first drive side projection 94a, the second drive side projection 94b, and the driven side projections 95a) as viewed from the protruding direction of the projection (i.e., any one of the first drive side projection 94a, the second drive side projection 94b, and the driven side projections 95a) can be the point connection, and the link device 90 can be smoothly inclined.

In the above description, an embodiment used for the drive transmission to a photoconductor drum (e.g., the photoconductor drum 40) has been described. However, the embodiment can be used for a drive transmission to a developing roller of a developing device, a fixing roller of a fixing device, an intermediate transfer belt of a transfer device, and the like.

This configurations according to the above-descried embodiments are not limited thereto. This disclosure can achieve the following aspects effectively.

Aspect 1

In Aspect 1, a drive transmission device (for example, the drive transmission device 70) includes a first rotary body (for example, the photoconductor gear 82), a second rotary body (for example, the coupling member 41), a first groove (for example, the drive side groove 85), a second groove (for example, the driven side groove 142), a link device (for example, the link device 90), a stopper (for example, the stopper 85a), an opening, a guide groove (for example, the first guide groove 86a and the second guide groove 86b), and a communication portion (for example, the communication portion 84). The first rotary body has a first hollow body (for example, the drive side cylindrical portion 82a) in a rotation center. The second rotary body has a second hollow body (for example, the driven side cylindrical portion 41b) in a rotation center. The first groove is formed in an inner peripheral surface of the first hollow body of the first rotary body and extending in an axial direction of the first rotary body. The second groove is formed in an inner peripheral surface of the second hollow body of the second rotary body and extending in an axial direction of the second rotary body. The link device is configured to link the first rotary body and the second rotary body and include a first inserting body (for example, the drive side spherical portion 91), a second inserting body (for example, the driven side spherical portion 92), and a link body (for example, the link body 93). The first inserting body has a first projection (for example, the first drive side projection 94a and the second drive side projection 94b) protruding in a radial direction to be engaged with the first groove and is configured to be inserted into the first hollow body of the first rotary body and to move in the first hollow body of the first rotary body in the axial direction. The second inserting body has a second projection (for example, the driven side projections 95a) protruding in a radial direction to be engaged with the second groove and is configured to be inserted into the second hollow body of the second rotary body. A position of the second projection is different from a position of the first projection in a direction of rotation of the first rotary body. The link body is configured to link the first inserting body and the second inserting body. The stopper is disposed at an end portion of the first groove on a side facing the second rotary body and configured to stop the first projection from being detached from the first groove. The guide groove has an opening that is formed in an end portion of the first hollow body of the first rotary body on a side facing the second rotary body and at a position different from a position of the first groove in a direction of rotation of the first rotary body. The guide groove is configured to extend in the axial direction of the first rotary body and guide the first projection into the first hollow body when the first inserting body is inserted into the first hollow body. The communication portion is configured to cause the guide groove and the first groove to communicate with each other in the first hollow body of the first rotary body. The end portion of the first hollow body of the first rotary body on the side facing the second rotary body is formed such that the second projection is relieved closer to the first rotary body than the stopper in the axial direction of the first rotary body and in the direction of rotation of the first rotary body when assembling the link device to the first rotary body.

In Aspect 1, a stopper (for example, the stopper 85a) is provided at the end portion of the first groove (for example, the drive side groove 85) on the side facing the second rotary body, so that the first projection (for example, the first drive side projection 94a and the second drive side projection 94b) is prevented from falling or being pulled out from the first groove. By so doing, the first inserting body can be prevented from being pulled out from the first hollow body of the first rotary body without providing a regulator. Accordingly, the number of components can be reduced and cost reduction of the device can be achieved.

In Aspect 1, the following configuration is provided so that the link device is assembled to the first rotary body even if the stopper is provided to the first groove. That is, the guide groove has an opening that is formed in an end portion of the first hollow body of the first rotary body on a side facing the second rotary body and the position of the opening is different from a position where the first groove is formed in the direction of rotation of the first rotary body. The guide groove extends from the opening in the axial direction of the first rotary body. The communication portion is provided inside the first hollow body of the first rotary body, so that the communication portion causes the guide groove and the first groove to communicate with each other in the first hollow body of the first rotary body.

When the first inserting body is inserted into the first hollow body of the first rotary body, the phase of the guide groove and the phase of the first projection in the direction of rotation are matched so that the first projection is inserted into the guide groove, and then the first inserting body is inserted into the first hollow body of the first rotary body. Consequently, the first projection is inserted into the guide groove. Then, the first inserting body is inserted into the first hollow body of the first rotary body, the link device is rotated, and then the first projection is moved from the guide groove to the first groove via the communication portion. Accordingly, the first projection is located at the first groove, and thus the link device is assembled to the first rotary body.

In recent years, there is an increase demand for reducing the size of an image forming apparatus. Specifically, it is expected that the second rotary body (for example, the coupling member 41) is located closer to the first rotary body. In order to achieve this demand, the length of the link device may need to be made shorter. However, in the above-described drive transmission device, the link device has the configuration in which the length from the first projection to the second projection is longer or greater than the length from the end portion of the first hollow body on the side facing the second rotary body to the communication portion of the first groove and the guide groove, and therefore the length of the link device cannot be reduced sufficiently. If the length from the first projection to the second projection is made shorter or smaller than the length from the end portion of the first hollow body of the first rotary body on the side facing the second rotary body to the communication portion of the first groove and the guide groove, the first projection cannot be located in the first groove. Therefore, the failure in a reduction in length of the link device is caused. Specifically, when the position of the second projection in the direction of rotation and the position of the first projection in the direction of rotation are different from each other, the second projection of the second inserting body abuts against the end portion of the first hollow body of the first rotary body on the side facing the second rotary body before the first projection reaches the communication portion. Therefore, the first projection cannot be located in the guide groove. Further, in a case in which the position of the second projection in the direction of rotation and the position of the first projection in the direction of rotation are the same, the second projection is inserted into the guide groove and the first projection can reach the communication portion. However, the second projection abuts against the side surface of the guide groove. Therefore, the link device cannot be rotated and the first projection cannot be located in the guide groove via the communication portion.

In order to address the inconvenience, Aspect 1 has the following two configurations.

One is the configuration in which the first projection and the second projection are located in different positions in the rotation direction. The other is the configuration in which the second projection is relieved in the axial direction and the rotation direction when the link device is assembled to the first rotary body.

Since the position of the second projection in the rotation direction is different from the position of the first projection in the rotation direction, when the link device is assembled to the first rotary body, even when the length from the first projection to the second projection is shorter or smaller than the length from the driven side end portion of the first hollow body of the first rotary body, the second projection does not enter the guide groove. Accordingly, this configuration does not cause inconvenient states, for example, in which the second projection abuts against the side surface of the guide groove, the link device cannot be rotated, and therefore the first projection cannot be guided to the guide groove via the communication portion.

Further, the second projection disposed at the position direction different from the first projection enters closer to the first rotary than the stopper, and therefore the second projection is relieved in the axial direction. By so doing, even when the length from the first projection to the second projection is shorter or smaller than the length from the driven side end portion of the first hollow body of the first rotary body, the first projection can reach the communication portion. In addition, the driven side end portion of the first hollow body of the first rotary body is designed such that the second projection can be relieved in the rotation direction as well as in the axial direction, when the link device is rotated so as to move the first projection to the first groove via the communication portion, the second projection does not hinder rotation of the link device. Accordingly, by rotating the link device, the first rotary body can be moved to the first groove via the communication portion, and therefore the link device can be assembled to the first rotary body.

Accordingly, even when the length extending from the first projection to the second projection is made shorter or smaller than the length extending from the end portion of the first hollow body of the first rotary body on the side facing the second rotary body to the communication portion, the link device can be assembled to the first rotary body. Consequently, the second rotary body can be located closer to the first rotary body, and therefore a reduction in size of the image forming apparatus in the axial direction.

Aspect 2

In Aspect 1, the drive transmission device (for example, the drive transmission device 70) further includes an undercut (for example, the undercut 88) recessed in an end face of the first hollow body (for example, the drive side cylindrical portion 82a) of the first rotary body (for example, the photoconductor gear 82) and extending in the direction of rotation of the first rotary body, the undercut configured to relieve the second projection (for example, the driven side projections 95a) closer to the first rotary body than the stopper (for example, the stopper 85a) in the axial direction of the first rotary body and in the direction of rotation of the first rotary body when assembling the link device to the first rotary body.

According to this configuration, as described in the embodiment above, when the link device (for example, the link device 90) is assembled to the first rotary body (for example, the photoconductor gear 82), the second projection (for example, the driven side projections 95a) are inserted into the undercut, so that the second projection can be relieved to the first rotary body deeper than the stopper (for example, the stopper 85a) in the axial direction. Consequently, the first projection (for example, the first drive side projection 94a and the second drive side projection 94b) are shifted to the communication portion (for example, the communication portion 84) without causing the second projection to abut the end portion of the first hollow body of the first rotary body. Further, the undercut extends in the rotation direction. When the link device is rotated to locate the first projection in the first groove (for example, the drive side groove 85), the second projection can be relieved in the rotation direction. Accordingly, even when the length (for example, the length L1) that extends from the first projection to the second projection is made smaller than the length (for example, the length L3) that extends from the end portion of the first hollow body of the first rotary body on the side facing the second rotary body to the communication portion, the first projection can be located at the first groove, and the link device can be assembled to the first rotary body.

Aspect 3

In Aspect 2, a height of the first projection (for example, the first drive side projection 94a) is higher than a height (for example, the height h1) of the second projection (for example, the driven side projections 95a) and a groove width (for example, the interval width W1) of at least a part of the undercut (for example, the undercut 88) is smaller than the height of the first projection.

According to this configuration, as described in the embodiment above, when the second inserting body (for example, the driven side spherical portion 92) is inserted into the first hollow body (for example, the drive side cylindrical portion 82a) of the first rotary body (for example, the photoconductor gear 82) wrongly, the first projection (for example, the first drive side projection 94a and the second drive side projection 94b) is not inserted into the undercut. Consequently, the link device cannot be inserted into the first hollow body of the first rotary body before the second projection reaches the communication portion (for example, the communication portion 84). Accordingly, in a case in which the second inserting body is inserted into the first hollow body of the first rotary body wrongly, the link device cannot be assembled to the first hollow body of the first rotary body, and therefore improper assembly of the link device can be prevented.

Aspect 4

In Aspect 1 or Aspect 2, a height (for example, the height h1) of the second projection (for example, the driven side projections 95a) is higher than a height (for example, the height h2) of the first projection (for example, the first drive side projection 94a and the second drive side projection 94b) and a groove depth of the guide groove is smaller than the height of the second projection.

According to this configuration, as illustrated in FIGS. 11A and 11B, when the second inserting body (for example, the driven side spherical portion 92) is to be inserted into the first hollow body (for example, the drive side cylindrical portion 82a) of the first rotary body (for example, the photoconductor gear 82) wrongly, the second projection is not inserted into the guide groove. Therefore, the second inserting body is not inserted into the first hollow body of the first rotary body. Consequently, in a case in which the second inserting body is inserted into the first hollow body of the first rotary body, the link device (for example, the link device 90) cannot be assembled to the first hollow body of the first rotary body. Accordingly, improper assembly of the link device can be prevented.

Aspect 5

In any one of Aspect 1 through Aspect 4, a diameter of the second inserting body (for example, the driven side spherical portion 92) of the second rotary body (for example, the coupling member 41) is equal to or smaller than an inner diameter of the first hollow body (for example, the drive side cylindrical portion 82a) of the first rotary body (for example, the photoconductor gear 82).

According to this configuration, as described in the embodiment above, in a case in which a length (for example, the length L1) extending from the first projection (for example, the first drive side projection 94a and the second drive side projection 94b) to the second projection (for example, the driven side projections 95a) is smaller or shorter than a length (for example, the length L3) extending from the end portion of the first hollow body of the first rotary body on the side facing the second rotary body (for example, the coupling member 41) to the communication portion (for example, the communication portion 84), the second inserting body can be inserted into the first hollow body of the first rotary body, and therefore the first projection can reach the communication portion.

Aspect 6

In any one of Aspect 1 through Aspect 5, the length (for example, the length L1) extending from an end portion of the first projection (for example, the first drive side projection 94a and the second drive side projection 94b) on a side facing the second inserting body (for example, the driven side spherical portion 92) to an end portion of the second projection (for example, the driven side projections 95a) on a side facing the first inserting body (for example, the drive side spherical portion 91) is shorter than a length (for example, the length L3) extending from the end portion of the first hollow body (for example, the drive side cylindrical portion 82a) of the first rotary body (for example, the photoconductor gear 82) on a side facing the second rotary body (for example, the coupling member 41) to the communication portion (for example, the communication portion 84).

According to this configuration, as described in the embodiment above, the length extending from the end portion of the first projection to the end portion of the second projection is equal to or smaller or shorter than the length (for example, the length L3) extending from the end portion of the first hollow body of the first rotary body on the side to the communication portion of the link device (for example, the link device 90). Accordingly, the first rotary body and the second rotary body (for example, the coupling member 41) are located closer to each other, and therefore the axial length of the image forming apparatus (for example, the image forming apparatus 1000) can be made shorter. This results in a reduction in side of the image forming apparatus.

Aspect 7

In any one of Aspect 1 through Aspect 6, wherein the first inserting body and the second inserting body includes a spherical portion having a lightened spherical shape, leaving a first large circle (for example, the first drive side large circle 91a and the first driven side large circle 92a) perpendicular to an X direction of the spherical portion, a second large circle (for example, the third drive side large circle 91c and the third driven side large circle 92c) perpendicular to a Y direction of the spherical portion, and a third large circle (for example, the second drive side large circle 91b and the second driven side large circle 92b) perpendicular to a Z direction of the spherical portion, where the X direction represents the axial direction, the Y direction represents a specific direction of directions perpendicular to the X direction, and the Z direction represents a direction perpendicular to both the X direction and the Y direction.

According to this configuration, as described with reference to FIGS. 7A through 7D, the sink marks of the inserting bodies can be restrained, and the inserting bodies can be accurately molded. Further, the link device can be molded using a first mold (for example, the first mold 391) moved in one direction (i.e., the Y1 direction) and a second mold (for example, the second mold 392) moved in an opposite direction to the first mold 391, and the number of molds can be reduced, compared with the configuration to light the insides of the inserting bodies, illustrated in FIGS. 6A through 6C. Further, even if a link body (for example, the linking member 93) of the link device (for example, the link device 90) is long, the first inserting body (for example, the drive side spherical portion 91) and the second inserting body (for example, the driven side spherical portion 92) can be uniformly lightened. Accordingly, even if the link body of the link device is long, the sink marks of the first inserting body and the second inserting body can be preferably restrained, and the first inserting body and the second inserting body can be accurately molded. Further, the diameter of the link body can be made smaller than the configuration to lighten the insides of the first inserting body and the second inserting body, and a reduction in side of the link device can be achieved.

Aspect 8

In Aspect 7, the link body has a shape in which a lightened portion of a cross shape in cross section including a linear portion extending in the Y direction and a linear portion extending in the Z direction, and a reinforcing portion having a square shape in cross section are alternately formed in the X direction.

According to this configuration, as described in the embodiment, the lightening of the link body (for example, the linking member 93) can be performed using the first mold (for example, the first mold 391) and the second mold (for example, the second mold 392), the sink marks of the link body can be restrained, and the link body can be accurately molded.

Aspect 9

In any one of Aspect 1 through Aspect 8, the drive transmission device further includes a phase matching device (for example, the first phase matching device 210 and the second phase matching device 220) configured to match a phase in the direction of rotation of the first rotary body (for example, the photoconductor gear 82) and a phase in a direction of rotation of the second rotary body (for example, the coupling member 41).

According to this configuration, as described in the embodiment above, speed variation of the rotary body, which is caused by speed variation of one rotation period of the first rotary body (for example, the photoconductor gear 82) and speed variation of one rotation period of the rotary body (for example, the photoconductor drum 40) attached to the same shaft as the second rotary body, can be made the same on a constant basis. Accordingly, it is not necessary to take data for restraint control of the speed variation of the rotary body (measurement of the speed variation of one rotation of the rotary body, using an encoder or the like), or to take data for restraint control of out of color registration (grasping the degree of the out of color registration by forming a patch pattern and detecting the patch pattern with an optical sensor) in every attachment and detachment of the rotary body, and the control of the device can be simplified.

Aspect 10

In Aspect 9, the phase matching device includes a first phase matching device (in the present embodiment, the first phase matching device 210 that is configured by the second drive side projection 94b and the second guide groove 86b) that matches the phase in a direction of rotation of the link device and the phase in the direction of rotation of the first rotary body (for example, the photoconductor gear 82), and a second phase matching device (in the present embodiment, the second phase matching device 220 that is configured by the driven side spherical portion 92 and a phase matching projection 144) that matches the phase in the direction of rotation of the link device and the phase in the direction of rotation of the second rotary body (for example, the coupling member 41).

According to this configuration, the link device (for example, the link device 90) is attached to the first rotary body at a predetermined phase in the rotating direction. Then, the second rotary body is attached to the link device at a predetermined phase, the link device having been attached to the first rotary body at a predetermined phase. Accordingly, the first rotary body and the second rotary body can be linked at the predetermined phases through the link device.

Aspect 11

In Aspect 10, at least one of the first phase matching device (for example, the first phase matching device 210) and the second phase matching device (for example, the second phase matching device 220) includes a phase matching projection (for example, the second drive side projection 94b) protruding in the radial direction from the peripheral surface of a respective one of the first inserting body and the second inserting body, and a phase matching guide groove (for example, the second guide groove 86b), into which the phase matching projection of the respective one of the first inserting body and the second inserting body is inserted, when the respective one of the first inserting body and the second inserting body is inserted into a corresponding one of the first hollow body of the first rotary body and the second hollow body of the second rotary body. The phase matching projection has a shape different from the projection (for example, the first drive side projection 94a). The phase matching guide groove has a shape different from the groove (for example, the first guide groove 86a) into which the projection is inserted when the respective one of the first inserting body and the second inserting body is inserted into the corresponding one of the first hollow body of the first rotary body and the second hollow body of the second rotary body. The phase matching projection is inserted into the phase matching groove.

According to this configuration, as described in the embodiment, when the link device (for example, the link device 90) and the first rotary body (for example, the photoconductor gear 82) are at a predetermined phase, the phase matching projection (for example, the second drive side projection 94b) having a different shape from the projection (for example, the first drive side projection 94a) can be inserted into the phase matching groove (for example, the second guide groove 86b), and the phases of the link device and the first drive transmitter can be matched with a predetermined phase.

It is to be noted that "different shape" here refers to different shape or different size (non-congruence).

Aspect 12

In Aspect 10 or Aspect 11, at least one of the first phase matching device and the second phase matching device includes a projection portion (for example, the phase matching projection 144) and a cut portion (for example, the cut portion 92c1 in the third driven side large circle 92c). The projection portion protrudes in the axial direction and located in a position shifted from a rotation center of a bottom surface of one of the first hollow body of the first rotary body and the second hollow body of the second rotary body. The cut portion is formed in a respective one of the first inserting body and the second inserting body such that the respective one of the first inserting body and the second inserting body is not in contact with the projection portion when the respective one of the first inserting body and the second inserting body is inserted into the one of the first hollow body of the first rotary body and the second hollow body of the second rotary body.

According to this configuration, when the second rotary body (for example, the coupling member 41) and the link device (for example, the link device 90) are at a predetermined phase, the projection portion (for example, the phase matching projection 144) enters the cut portion that is the cut portion 92c1 in the third driven side large circle 92c of the inserting body (for example, the driven side spherical portion 92), and the inserting body (for example, the driven side spherical portion 92) of the link device can be inserted into the second hollow body of the second rotary body, and the drive link between the link and the second rotary body can be performed.

Aspect 13

In any one of Aspect 1 through Aspect 12, the first projection (for example, the first drive side projection 94a and the second drive side projection 94b) includes a regulator (for example, the regulating projection 102) configured to regulate movement of the projection from the groove (for example, the drive side groove 85) to the guide groove through the communication portion (for example, the communication portion 84).

According to this configuration, as described in the embodiment, the first projection (for example, the first drive side projection 94a and the second drive side projection 94b) inserted into the groove (for example, the drive side grooves 85) can be prevented from being moved to the guide grooves (for example, the first guide groove 86a and the second guide groove 86b) from the grooves (such as the drive side grooves 85) through the communication portion (for example, the communication portion 84). Accordingly, the link device can be prevented from being pulled out from the first rotary body (for example, the photoconductor gear 82).

Aspect 14

In any one of Aspect 1 through Aspect 13, each of the first projection (for example, the first drive side projection 94a and the second drive side projection 94b) and the second projection (for example, the driven side projections 95a) has a groove abutting portion to which the first projection and the second projection contact the groove while the driving force is transmitted to the rotary body. The groove abutting portion is formed projecting in a direction of rotation of the link device and linearly extending in a radial direction of the link device.

According to this configuration, rotation speed variation can be restrained, as described with reference to FIGS. 21A through 25.

Aspect 15

In any one of Aspect 1 through Aspect 14, the drive transmission device further includes a biasing body (for example, the coil spring 73) configured to bias the link device (for example, the link device 90) toward the second rotary body (for example, the coupling member 41).

According to this configuration, as described in the embodiment above, when the second rotary body (for example, the coupling member 41) and the link device (for example, the link device 90) are linked, even when the phase of the second rotary body and the phase of the link device do not match in the direction of rotation and the second inserting body (for example, the driven side spherical portion 92) is not inserted into the second rotary body, the link device is moved in the axial direction against the biasing force applied by the biasing body (for example, the coil spring 73). Accordingly, the rotary body (for example, the photoconductor drum 40) to which the second rotary body is attached can be attached to the apparatus body (for example, the apparatus body 1). When the driving is started, the link device is driven to rotate, and consequently the phase of the link device and the phase of the second rotary body are matched with each other, the link device is moved in the axial direction by the biasing force of the biasing body, and the second inserting body can be brought to enter the second hollow body of the second rotary body, the drive link between the link device and the second rotary body is coupled, and the second rotary body can be driven to rotate.

Aspect 16

An image forming apparatus (for example, the image forming apparatus 1000) includes an apparatus body (for example, the apparatus body 1) the drive transmission device (for example, the drive transmission device 70) according to any one of Aspect 1 through Aspect 15.

According to this configuration, rotating speed variation of the rotary body (for example, the photoconductor drum 40) that is transmitted from the drive transmission device can be restrained, thereby forming a preferable image. Further, a reduction in size of the image forming apparatus can be achieved.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A drive transmission device comprising:
   a first rotary body having a first hollow body in a rotation center;
   a second rotary body having a second hollow body in a rotation center;
   a first groove formed in an inner peripheral surface of the first hollow body of the first rotary body and extending in an axial direction of the first rotary body;
   a second groove formed in an inner peripheral surface of the second hollow body of the second rotary body and extending in an axial direction of the second rotary body;
   a link device configured to link the first rotary body and the second rotary body, the link device including:
      a first inserting body having a first projection protruding in a radial direction to be engaged with the first groove, the first inserting body configured to be inserted into the first hollow body of the first rotary body and to move in the first hollow body of the first rotary body in the axial direction;
      a second inserting body having a second projection protruding in a radial direction to be engaged with the second groove, the second inserting body configured to be inserted into the second hollow body of the second rotary body,
      a position of the second projection being different from a position of the first projection in a direction of rotation of the first rotary body; and
      a link body configured to link the first inserting body and the second inserting body;
   a stopper disposed at an end portion of the first groove on a side facing the second rotary body and configured to stop the first projection from being detached from the first groove;

a guide groove having an opening formed in an end portion of the first hollow body of the first rotary body on a side facing the second rotary body and at a position different from a position of the first groove in a direction of rotation of the first rotary body, the guide groove configured to extend in the axial direction of the first rotary body and guide the first projection into the first hollow body when the first inserting body is inserted into the first hollow body; and a communication portion configured to cause the guide groove and the first groove to communicate with each other in the first hollow body of the first rotary body, the end portion of the first hollow body of the first rotary body on the side facing the second rotary body being formed such that the second projection is relieved closer to the first rotary body than the stopper in the axial direction of the first rotary body and in the direction of rotation of the first rotary body when assembling the link device to the first rotary body.

2. The drive transmission device according to claim 1, further comprising an undercut recessed in an end face of the first hollow body of the first rotary body and extending in the direction of rotation of the first rotary body, the undercut configured to relieve the second projection closer to the first rotary body than the stopper in the axial direction of the first rotary body and in the direction of rotation of the first rotary body when assembling the link device to the first rotary body.

3. The drive transmission device according to claim 2, wherein a height of the first projection is higher than a height of the second projection, and wherein a groove width of at least a part of the undercut is smaller than the height of the first projection.

4. The drive transmission device according to claim 1, wherein a height of the second projection is higher than a height of the first projection, and wherein a groove depth of the guide groove is smaller than the height of the second projection.

5. The drive transmission device according to claim 1, wherein a diameter of the second inserting body of the second rotary body is equal to or smaller than an inner diameter of the first hollow body of the first rotary body.

6. The drive transmission device according to claim 1, wherein a length extending from an end portion of the first projection on a side facing the second inserting body to an end portion of the second projection on a side facing the first inserting body is shorter than a length extending from the end portion of the first hollow body of the first rotary body on a side facing the second rotary body to the communication portion.

7. The drive transmission device according to claim 1, wherein the first inserting body and the second inserting body includes a spherical portion having a lightened spherical shape, leaving a first large circle perpendicular to an X direction of the spherical portion, a second large circle perpendicular to a Y direction of the spherical portion, and a third large circle perpendicular to a Z direction of the spherical portion, where the X direction represents the axial direction, the Y direction represents a specific direction of directions perpendicular to the X direction, and the Z direction represents a direction perpendicular to both the X direction and the Y direction.

8. The drive transmission device according to claim 7, wherein the link body has a shape in which a lightened portion of a cross shape in cross section including a linear portion extending in the Y direction and a linear portion extending in the Z direction, and a reinforcing portion having a square shape in cross section are alternately formed in the X direction.

9. The drive transmission device according to claim 1, further comprising a phase matching device configured to match a phase in the direction of rotation of the first rotary body and a phase in a direction of rotation of the second rotary body.

10. The drive transmission device according to claim 9, wherein the phase matching device includes:
a first phase matching device configured to match a phase in a direction of rotation of the link device and the phase in the direction of rotation of the first rotary body; and
a second phase matching device configured to match the phase in the direction of rotation of the link device and the phase in the direction of rotation of the second rotary body.

11. The drive transmission device according to claim 10, wherein at least one of the first phase matching device and the second phase matching device includes:
a phase matching projection protruding in the radial direction from the peripheral surface of a respective one of the first inserting body and the second inserting body; and
a phase matching guide groove, into which the phase matching projection of the respective one of the first inserting body and the second inserting body is inserted, when the respective one of the first inserting body and the second inserting body is inserted into a corresponding one of the first hollow body of the first rotary body and the second hollow body of the second rotary body,
wherein the phase matching projection has a shape different from the projection,
wherein the phase matching guide groove has a shape different from the groove into which the projection is inserted when the respective one of the first inserting body and the second inserting body is inserted into the corresponding one of the first hollow body of the first rotary body and the second hollow body of the second rotary body, and
wherein the phase matching projection is inserted into the phase matching groove.

12. The drive transmission device according to claim 10, wherein at least one of the first phase matching device and the second phase matching device includes:
a projection portion protruding in the axial direction and located in a position shifted from a rotation center of a bottom surface of one of the first hollow body of the first rotary body and the second hollow body of the second rotary body, and
a cut portion formed in a respective one of the first inserting body and the second inserting body such that the respective one of the first inserting body and the second inserting body is not in contact with the projection portion when the respective one of the first inserting body and the second inserting body is inserted into the one of the first hollow body of the first rotary body and the second hollow body of the second rotary body.

13. The drive transmission device according to claim 1, wherein the projection includes a regulator configured to regulate movement of the projection from the groove to the guide groove through the communication portion.

14. The drive transmission device according to claim 1,
wherein each of the first projection and the second projection has a groove abutting portion to which the first projection and the second projection contact the groove while the driving force is transmitted to the rotary body, and
wherein the groove abutting portion is formed projecting in a direction of rotation of the link device and linearly extending in a radial direction of the link device.

15. The drive transmission device according to claim 1, further comprising a biasing body configured to bias the link device toward the second rotary body.

16. An image forming apparatus comprising:
an apparatus body having a shaft; and
the drive transmission device according to claim 1, configured to transmit a driving force to the apparatus body.

* * * * *